(12) United States Patent
Watanabe

(10) Patent No.: US 7,617,237 B2
(45) Date of Patent: Nov. 10, 2009

(54) ENCODING DEVICE, ENCODING METHOD, DECODING DEVICE, DECODING METHOD, PROGRAM AND MACHINE READABLE RECORDING MEDIUM CONTAINING THE PROGRAM

(75) Inventor: Shuichi Watanabe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 182 days.

(21) Appl. No.: 11/664,251

(22) PCT Filed: Sep. 28, 2005

(86) PCT No.: PCT/JP2005/017844

§ 371 (c)(1),
(2), (4) Date: Mar. 30, 2007

(87) PCT Pub. No.: WO2006/035813

PCT Pub. Date: Apr. 6, 2006

(65) Prior Publication Data

US 2008/0027973 A1     Jan. 31, 2008

(30) Foreign Application Priority Data

Sep. 30, 2004 (JP) .............................. 2004-287084

(51) Int. Cl.
  *G06F 17/00* (2006.01)
(52) U.S. Cl. ..................... 707/102; 382/240
(58) Field of Classification Search ........................ None
See application file for complete search history.

(56) References Cited

U.S. PATENT DOCUMENTS 4,944,023 A * 7/1990 Imao et al. ................... 382/240
5,956,026 A * 9/1999 Ratakonda ................... 715/723
5,982,938 A * 11/1999 Dube .......................... 382/240
6,721,751 B1   4/2004 Furusho
2003/0009472 A1 * 1/2003 Azami et al. ................. 707/101
2003/0105956 A1 * 6/2003 Ishiguro et al. .............. 713/158

FOREIGN PATENT DOCUMENTS

| EP | 1191462 | 3/2002 |
| JP | 2000-339390 | 12/2000 |
| JP | 2003-092757 | 3/2003 |

* cited by examiner

*Primary Examiner*—Mohammad Ali
*Assistant Examiner*—Syed H Hasan
(74) *Attorney, Agent, or Firm*—Edwards Angell Palmer & Dodge LLP; David G. Conlin; Peter J. Manus

(57) ABSTRACT

A device divides a table (60) including element information contained in tree-structure information and position information in a corresponding tree-structure into an element information value (61) and position information (62) by a table division unit (101). An element information rearrangement unit (103) rearranges the divided element information values (61) into an order in a dictionary. Correspondence information (703) indicating the order change by this rearrangement is extracted by a correspondence information extraction unit (104). A position information encoding unit (102) and a corresponding information encoding unit (105) encode the position information (62) and the correspondence information (703), respectively. By using the encoded position information (62) and the correspondence information (703) and the element information values (61), a compressed information forming unit (106) forms compressed information from these.

18 Claims, 18 Drawing Sheets

FIG.3

| 61: VALUES OF ELEMENT INFORMATION | 62: POSITION INFORMATION (SCENE #, SUB-SCENE #, PERFORMER #) |
|---|---|
| Akira ABE | 1, 1, 1 |
| Rie RYUSHO | 1, 1, 2 |
| Wataru WADA | 1, 1, 3 |
| Keiko KUBO | 1, 2, 1 |
| Natsuki NISHI | 1, 2, 2 |
| Rie RYUSHO | 2, 1, 1 |

ELEMENT TYPE A
VALUE A1
POSITION INFORMATION A1
VALUE A2
POSITION INFORMATION A2
...

ELEMENT TYPE B
VALUE B1
POSITION INFORMATION B1
VALUE B2
POSITION INFORMATION B2
...

(B) 64

ELEMENT TYPE A
VALUE A1
VALUE A2
...
POSITION INFORMATION A1
POSITION INFORMATION A2
...

ELEMENT TYPE B
VALUE B1
VALUE B2
...
POSITION INFORMATION B1
POSITION INFORMATION B2
...

FIG.5
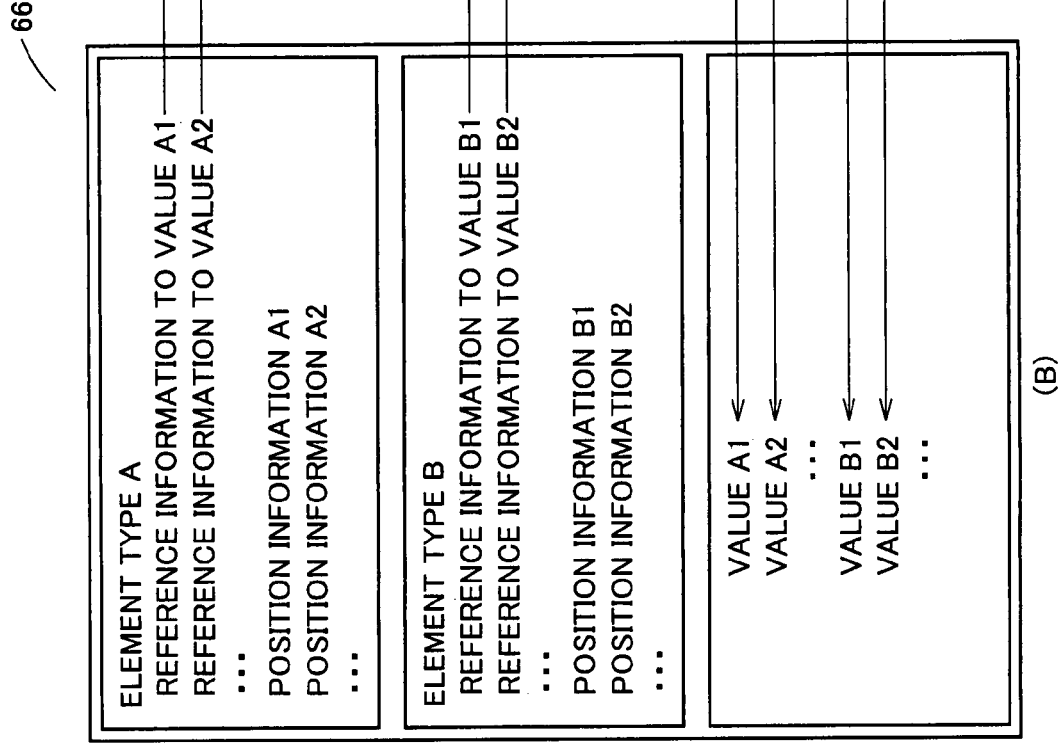
(B)
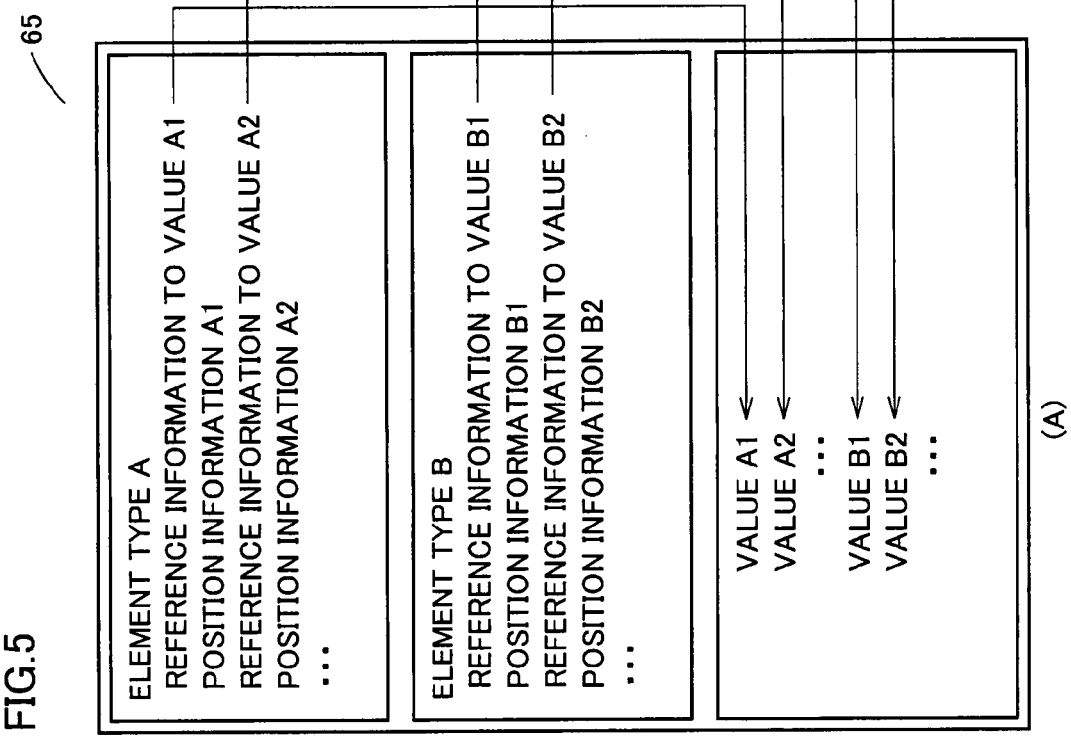
(A)

| 61: VALUES OF ELEMENT INFORMATION | 62: POSITION INFORMATION (SCENE #, SUB-SCENE #, PERFORMER #) |
|---|---|
| Akira ABE | 1, 1, 1 |
| Keiko KUBO | 1, 2, 1 |
| Natsuki NISHI | 1, 2, 2 |
| Rie RYUSHO | 1, 1, 2 |
| Rie RYUSHO | 2, 1, 1 |
| Wataru WADA | 1, 1, 3 |

| CODE | CODE MEANING |
|---|---|
| 000 | END CODE |
| 001 | CODE REPRESENTING BRANCH (UPDATE) AT SCENE LEVEL |
| 010 | CODE REPRESENTING BRANCH (UPDATE) AT SUB-SCENE LEVEL |
| 011 | CODE REPRESENTING BRANCH (UPDATE) AT PERFORMER LEVEL |
| 100−110 | NOT USED |
| 111 | MISSING CODE |

| ELEMENTS IN LEXICOGRAPHIC ORDER | | ELEMENTS IN LEXICOGRAPHIC ORDER |
|---|---|---|
| 1, 1, 1 | ALLOCATE SERIAL NUMBER STARTING FROM SMALLER VALUE ⇒ | (1) 1, 1, 1 |
| 1, 2, 1 | | (4) 1, 2, 1 |
| 1, 2, 2 | | (5) 1, 2, 2 |
| 1, 1, 2 | | (2) 1, 1, 2 |
| 2, 1, 1 | | (6) 2, 1, 1 |
| 1, 1, 3 | | (3) 1, 1, 3 |

(B)

703

| CORRESPONDENCE INFORMATION |
|---|
| 1 |
| 4 |
| 5 |
| 2 |
| 6 |
| 3 |

(C)

| BEFORE REARRANGEMENT | ALLOCATE SERIAL NUMBER | | REARRANGE IN MAGNITUDE ORDER | AFTER REARRANGEMENT | USING SERIAL NUMBERS AS VALUES, ALLOCATE SERIAL NUMBER AGAIN | | REARRANGE IN MAGNITUDE ORDER OF VALUES | |
|---|---|---|---|---|---|---|---|---|
| 1, 1, 1 | (1) 1, 1, 1 | ⇒ S1402 | | (1) 1, 1, 1 | ⇒ S1403 | (1) 1 | ⇒ S1404 | (1) 1 |
| 1, 2, 1 | (2) 1, 2, 1 | | | (4) 1, 1, 2 | | (2) 4 | | (4) 2 |
| 1, 2, 2 | (3) 1, 2, 2 | | | (6) 1, 1, 3 | | (3) 6 | | (5) 3 |
| 1, 1, 2 | (4) 1, 1, 2 | | | (2) 1, 2, 1 | | (4) 2 | | (2) 4 |
| 2, 1, 1 | (5) 2, 1, 1 | | | (3) 1, 2, 2 | | (5) 3 | | (6) 5 |
| 1, 1, 3 | (6) 1, 1, 3 | | | (5) 2, 1, 1 | | (6) 5 | | (3) 6 |

↑ S1401

(D)

703

| CORRESPONDENCE INFORMATION |
|---|
| 1 |
| 4 |
| 5 |
| 2 |
| 6 |
| 3 |

FIG.19

| VALUE OF ELEMENT INFORMATION | FRAGMENT # |
|---|---|
| Akira ABE | 1 |
| Keiko KUBO | 2 |
| Natsuki NISHI | 2 |
| Rie RYUSHO | 1 |
| Rie RYUSHO | 3 |
| Wataru WADA | 1 |

ENCODING DEVICE, ENCODING METHOD, DECODING DEVICE, DECODING METHOD, PROGRAM AND MACHINE READABLE RECORDING MEDIUM CONTAINING THE PROGRAM

TECHNICAL FIELD

The present invention relates to an encoding device, an encoding method, a decoding device, a decoding method, a program and a machine-readable recoding medium on which the program is recorded, for information having a tree-structure. Particularly, the present invention relates to an encoding device, an encoding method, a decoding device, a decoding method, a program and a machine-readable recoding medium on which the program is recorded, in which element information as plurality of leaves of the tree-structure and position information representing the positions of the leaves on the tree-structure are processed by establishing correspondence with each other.

BACKGROUND ART

Recent increase in storage capacity of video recording apparatuses and widespread use of high-speed/broadband networks have created an environment that can provide the user with a huge amount of video images at one time. In order for the user to efficiently utilize the provided video data, a function of searching for desired data of video image or partial video image (shot, cut) through the video data at high-speed in a simple manner is required. As one such function, an approach has been proposed in which information to be added to the video data (hereinafter referred to as additional information) related to the video image is prepared in advance and the search is done aided by the additional information. By this function, it is possible to search for a desired one from a catalogue of video titles and to provide the corresponding video data, or it is possible to prepare additional information representing contents of the video images in grater detail, allowing the user to search based on the contents.

FIG. 17 shows an example of the additional information describing the contents of video images presented by certain video data, applicable to the prior art and to an embodiment of the present invention. As can be seen from FIG. 17, the additional information is represented by a tree-structure that corresponds to a logic structure of the video image.

Generally, a movie content is made up of one or a plurality of scenes, and each scene is made up of one or a plurality of sub-scenes (or shots), or still another scene, that is, the content has a hierarchy. For higher convenience in searching through video images, search information representing characteristics of a sub-scene is added to each sub-scene, which information is described using a tree-structure expression such as shown in FIG. 17, to express the hierarchy mentioned above. In the example of FIG. 17, the video as a whole consists of two scenes, which are made up of two sub-scenes and one sub-scene, respectively. For each sub-scene, related information of the sub-scene, in this example the time information (start time/length), title and performer or performers appearing at the sub-scene, is described. In the tree-structure, the video data as a whole is the root (root node) RN, and nodes representing types of elements such as the scene and sub-scene as well as the time information, title and performer are the nodes N. Among the nodes N, the level of scenes corresponds to the first branch destination when viewed from the root node RN, and hence, the scenes are the nodes N of the first level. Sub-scenes are the nodes N of the second level. The data representing the time information, title and performer as the related information of each sub-scene correspond to the leaves L of the tree-structure.

The information added as a leaf L will be hereinafter referred to as "element information" or simply "element" of the search information.

Here, in order to tell which element information is which leaf L of the tree-structure, it is necessary to store the value of the element and, at the same time, to store the information representing the position of the element in the tree-structure. In other words, information specifying to which sub-scene of which scene the element belongs is required. In FIG. 17, numbers "1" and "2" allotted to distinguish scenes or sub-scenes in one scene from each other, and numbers "1", "2" and "3" allotted to distinguish a plurality of performers from each other in the sub-scenes are pieces of information for uniquely identifying the positions of the elements in the tree-structure as described above, which information is referred to as "position information." The position information is expressed in accordance with an order relation defined in the tree structure. An example will be described in the following.

In the tree structure, all nodes N positioned below a node N (or root node RN) are denoted by serial numbers 1, 2, . . . from the left to the right of the tree. Position information of a certain leaf L is given by listing the serial numbers allotted to all nodes N from the root node RN to the certain leaf L.

Referring to FIG. 17, the specific manner of generating the position information in accordance with the defined order will be described, taking the third from the left element "Akira ABE" as an example. When the tree is scanned starting from the upper to the lower level and on one same level from the left to the right, nodes N (or root node RN or leaves L) appear one after another, and the position information is allotted to each node in the order of appearance.

Starting from the first level, the scene to which the element "Akira ABE" belongs is the leftmost node N hanging from the video of root node RN. Therefore, the position information of the first level is "1". On the second level, the sub-scene to which the element "Akira ABE" belongs is the first from the left node among the nodes N hanging from scene "1" of the upper level node N. Therefore, the position (order of appearance) of the second level is "1". Next, on the third level, the leaf L of the element "Akira ABE" is the first from the left node among the nodes N of "performers" hanging from sub-scene "1". Therefore, the position (order of appearance) among the elements "performers" of the third level is "1". Therefore, in this example, the position information of element "Akira ABE" is, from the first to third levels combined, (1,1,1). The position information of every leaf L can uniquely be expressed in this format.

The search proceeds in the following manner. Referring to FIG. 17, first, the sub-scene at which "Wataru WADA" appears is searched for. Specifically, query "performer=Wataru WADA" is entered, and among the pieces of element information (leaves L) representing performers, one that matches with the query "Wataru WADA" is searched for. When an element that satisfies the condition is found, a piece of information representing the sub-scene to which it belongs ("sub-scene 1 of scene 1") is returned as a search result. The sub-scene is reproduced with reference to the time information added to the leaf L of the sub-scene.

FIG. 17 is a very simple example of additional information, while the actual types of elements are not limited to these, and complicated video images have complicated tree-structures. Therefore, the additional information generally has a large size. For this reason, it is often the case that the additional information is handled in a pre-divided form, and at the time of use, only the necessary piece of information is obtained and used.

FIG. 18 shows an example in which the tree-structure of the additional information shown in FIG. 17 is divided into easier-to-handle forms (divided sub-scene by sub-scene). Each divided tree is referred to as a "sub-tree" or a "fragment". Further, in order to allow "performer" based search described above, a table such as shown in FIG. 19 is prepared as auxiliary information. The table of FIG. 19 stores values of all pieces of element information (performers) of the tree-structure as well as pieces of fragment information representing which element information belongs to which partial tree (fragment).

Here, the search for a video image using the additional information proceeds in the following manner. First, in response to a request, the system transmits the table shown in FIG. 19 to the user. The user searches through the table for a match of the query "Wataru WADA" and reads corresponding fragment information. Then, the data of the fragment ("fragment 1") indicated by the read fragment information is requested. In response to the request, the system transmits the data of "fragment 1" to the user, the user receives the data of "fragment 1" and uses the received data of "fragment 1". The sub-scene is reproduced with reference to the "time information" of the obtained fragment data.

Specific example of the auxiliary information shown in FIG. 19 may include "Indexing" technique of TV Anytime Phase 1, Part 3-2 standard (ESTI TS 102 822-3-2).

Though information for indicating individual fragment is provided separate from the additional information of FIG. 17 in the examples of FIGS. 18 and 19, such information may be replaced by the position information included in the additional information of FIG. 17.

The table of FIG. 19 is always transmitted, no matter whether it is actually used or not. Therefore, considering transmission efficiency, it is preferred to have the table compressed and coded before transmission. In this respect, Japanese Patent Laying-Open No. 2003-092757 (Patent Document 1) discloses, as a method of encoding a plurality of pieces of position information with high rate of compression, a method of differentially coding pieces of position information having continuous values in the order of magnitude. In this differential coding method, the position information of a certain leaf L (or a certain node N) of the tree structure is not directly described, but the position information is encoded using only the deviation (difference) between the position information of interest and the position information of a leaf L (or node N) of one previous order in the tree-structure. This effectively enables more efficient coding using smaller number of bits.

Patent Document 1: Japanese Patent Laying-Open No. 2003-092757

DISCLOSURE OF THE INVENTION

Problems to be Solved by the Invention

As shown in FIG. 19, when the type of each element (value of element information) of the listed-up pieces of additional information indicates that the corresponding element is information in text format, arrangement of these is changed from the order of appearance (order of values of the pieces of position information) in the additional information (tree-structure) to lexicographic ordering, based on the types, so as to attain higher search efficiency. When pieces of information in text format are arranged in the lexicographic ordering, the amount of operation necessary for searching out a desired piece of information from the pieces of information comes to be in logarithmic order, which is known to realize higher search efficiency than when they are not in the lexicographic order.

When the values of the pieces of element information in the table of FIG. 19 are rearranged in the lexicographic order, corresponding values of pieces of position information are also rearranged, and therefore, the relation of arrangement in accordance with the magnitude of position information values is lost. For this reason, when the value of the pieces of element information are rearranged in the lexicographic order, it is impossible to apply the differential coding method described in Patent Document 1 to the corresponding pieces of position information.

Therefore, an object of the present invention is to provide an encoding device, an encoding method, a program and a machine-readable recoding medium on which the program is recorded, that can provide information allowing highly efficient searching, for information having a tree-structure, as well as to provide a decoding device, a decoding method, a program and a machine-readable recoding medium on which the program is recorded, for decoding the thus encoded information.

Another object of the present invention is to provide an encoding device, an encoding method, a program and a machine-readable recoding medium on which the program is recorded, that can provide information allowing highly efficient encoding, for information having a tree-structure, as well as to provide a decoding device, a decoding method, a program and a machine-readable recoding medium on which the program is recorded, for decoding the thus encoded information.

Means for Solving the Problems

According to an aspect, the present invention encodes information formed in a tree-structure in which a defined order relation holds among a plurality of leaves having element information added.

First, an information group having a plurality of sets, arranged in the defined order, containing element information of a prescribed type and position information representing a position of the leaf having the element information of the prescribed type added, in accordance with said defined order in a tree-structure, is received. A rearranging unit divides a plurality of pieces of element information from the plurality of sets of the received information group, and rearranges the divided plurality of pieces of element information to a prescribed order. A correspondence information generating unit generates correspondence information. The correspondence information represents correspondence between each of the plurality of pieces of element information after rearrangement and the position information of the same set as the element information in the received information group, based on a change in order of the plurality of pieces of element information caused by the rearrangement from the defined order to the prescribed order.

A position information encoding unit divides the position information from the plurality of sets in the received information group, and encodes the divided plurality of pieces of position information. A compressed information forming unit forms compressed information corresponding to the information group, by arranging the encoded position information, the generated correspondence information, and the rearranged element information in a prescribed form.

The above-described prescribed order refers to an order suitable for searching of element information of a prescribed type.

According to another aspect, the present invention encodes information formed in a tree-structure in which a defined order relation holds among a plurality of leaves having element information added.

First, an information group having a plurality of sets, arranged in a prescribed order, containing element information of the prescribed type and position information representing a position of the leaf having the element information of the prescribed type added, in accordance with the defined order in the tree-structure, is received by a receiving unit.

An element information dividing unit divides and outputs the element information from the plurality of sets in the received information group. A position information rearranging unit divides the position information from the plurality of sets in the received information, and rearranges the divided plurality of pieces of position information in accordance with the defined order. Further, a correspondence information generating unit generates correspondence information. The correspondence information represents correspondence between each of the plurality of pieces of position information after rearrangement and the element information of the same set as the position information in the received information, based on a change in order of the plurality of pieces of position information caused by the rearrangement.

A position information encoding unit encodes the plurality of rearranged pieces of position information. A compressed information forming unit forms compressed information corresponding to the information group, by arranging the encoded position information, the generated correspondence information and the divided element information in a prescribed form.

The above-described prescribed order refers to an order suitable for searching of element information of a prescribed type.

According to a still another aspect, the present invention decodes compressed information formed in a tree-structure in which a defined order relation holds among a plurality of leaves having element information added. The compressed information refers to information provided by encoding an information group having a plurality of sets including element information of a prescribed type in information formed in a tree-structure and position information representing the position of a leaf having the element information of the prescribed type added, in the tree-structure.

First, the compressed information is received by the receiving unit. The compressed information refers to information formed to include a plurality of pieces of element information arranged in a prescribed order, encoded pieces of position information representing positions of the plurality of leaves having the plurality of pieces of element information added in accordance with the defined order in the tree-structure, and correspondence information for specifying the position information respectively corresponding to the plurality of pieces of element information arranged in accordance with the defined order, among the plurality of pieces of position information, is received by a receiving unit. A dividing unit divides and outputs the plurality of pieces of element information, the plurality of encoded pieces of position information and the correspondence information, from the received compressed information.

A position information decoding unit decodes the divided plurality of encoded pieces of position information. A rearranging unit rearranges the decoded plurality of pieces of position information in accordance with the divided correspondence information.

Information having each of the plurality of rearranged pieces of position information, and each of the plurality of divided pieces of element information arranged in the prescribed order, related in correspondence with each other, is output.

The above-described prescribed order refers to an order suitable for searching of element information of a prescribed type.

EFFECTS OF THE INVENTION

In the present invention, the compressed information generated by encoding the information having the tree-structure includes a plurality of pieces of element information of a prescribed type, added to a plurality of leaves of the tree-structure. The plurality of pieces of element information are arranged in the order suitable for searching of the element information of the prescribed type. Therefore, it becomes possible to attain high search efficiency in searching for a prescribed piece of information.

As to the encoding of position information, the position information of the information group can efficiently be encoded by differential coding. As a result, the amount of information can be reduced, while the types and amounts of information necessary to obtain the original pieces of information through decoding are retained, for the compressed information. Accordingly, when the compressed information generated by encoding the information group is transmitted, high transmission rate can be realized. When the compressed information is stored in a storage medium, necessary memory capacity can be made smaller.

BRIEF DESCRIPTION OF THE DRAWINGS

FIG. 3 shows an example of a table storing information in accordance with an order of appearance in the tree-structure.

FIG. 4 shows a specific example of data structures in the table.

FIG. 5 shows another specific example of data structures in the table.

FIG. 7 shows information in the form of a table in which pieces of element information are arranged in lexicographic order.

FIG. 14 shows an example of a process for extracting correspondence information in accordance with the second embodiment.

FIG. 19 shows a conventional example of the information in the form of a table.

DESCRIPTION OF THE REFERENCE SIGNS

101, 901 table dividing unit, 102, 902 position information encoding unit, 103 element information rearranging unit, 104, 904 correspondence information extracting unit, 105, 905 correspondence information encoding unit, 106, 906 compressed information forming unit, 201 compressed information dividing unit, 202 position information decoding unit, 203 correspondence information decoding unit, 204 position information rearranging unit, 205 table forming unit, 903 position information rearranging unit, 1601 CPU, 1602 ROM, 1603 RAM, 1604 HDD, 1605 interface, 1606 communication device, 1607 input unit, 1608 output unit, 1613 bus.

BEST MODES FOR CARRYING OUT THE INVENTION

In the first to third embodiments described in the following, for information formed to have a tree-structure, a table or information stored in the table, which is referred to as auxiliary information as an aid for searching information having a tree-structure, is encoded, and the table or the information is compressed as a result. In the following, this will be referred to as compression coding. The table stores a plurality of records each consisting of element information allotted to each of the plurality of leaves L of the tree-structure and position information representing the position of the leaf L in the tree-structure in accordance with the defined order described above. At the time of compression coding, a plurality of pieces of element information (text information representing names of performers) in the table are held arranged in lexicographic order. The position information of each of the plurality of records in the table is encoded based on a difference between the leaf having the position information of interest and the position information of a leaf that is positioned (appears) immediately before in accordance with the defined order mentioned above. Then, information representing the correspondence between each of the plurality of pieces of element information and the position information is generated and encoded. Then, one piece of information having these pieces of information arranged in a prescribed format is formed. The information thus formed is obtained as the above-described auxiliary information as an aid for searching.

Figure 17:
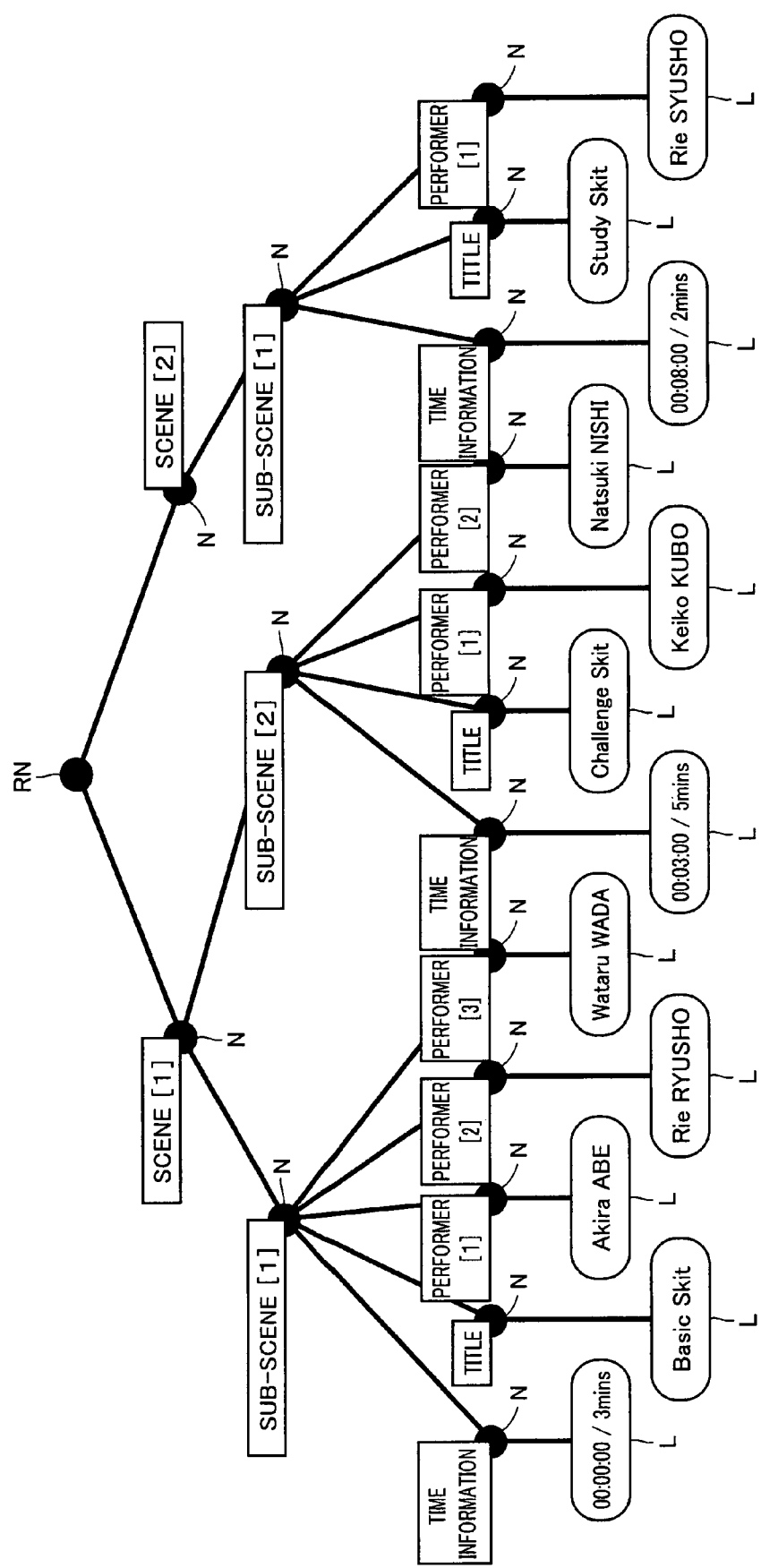
FIG. 17 shows an example of additional information of a video image having the tree-structure, applicable to the prior art and to the embodiments of the present invention.
Figure 18:
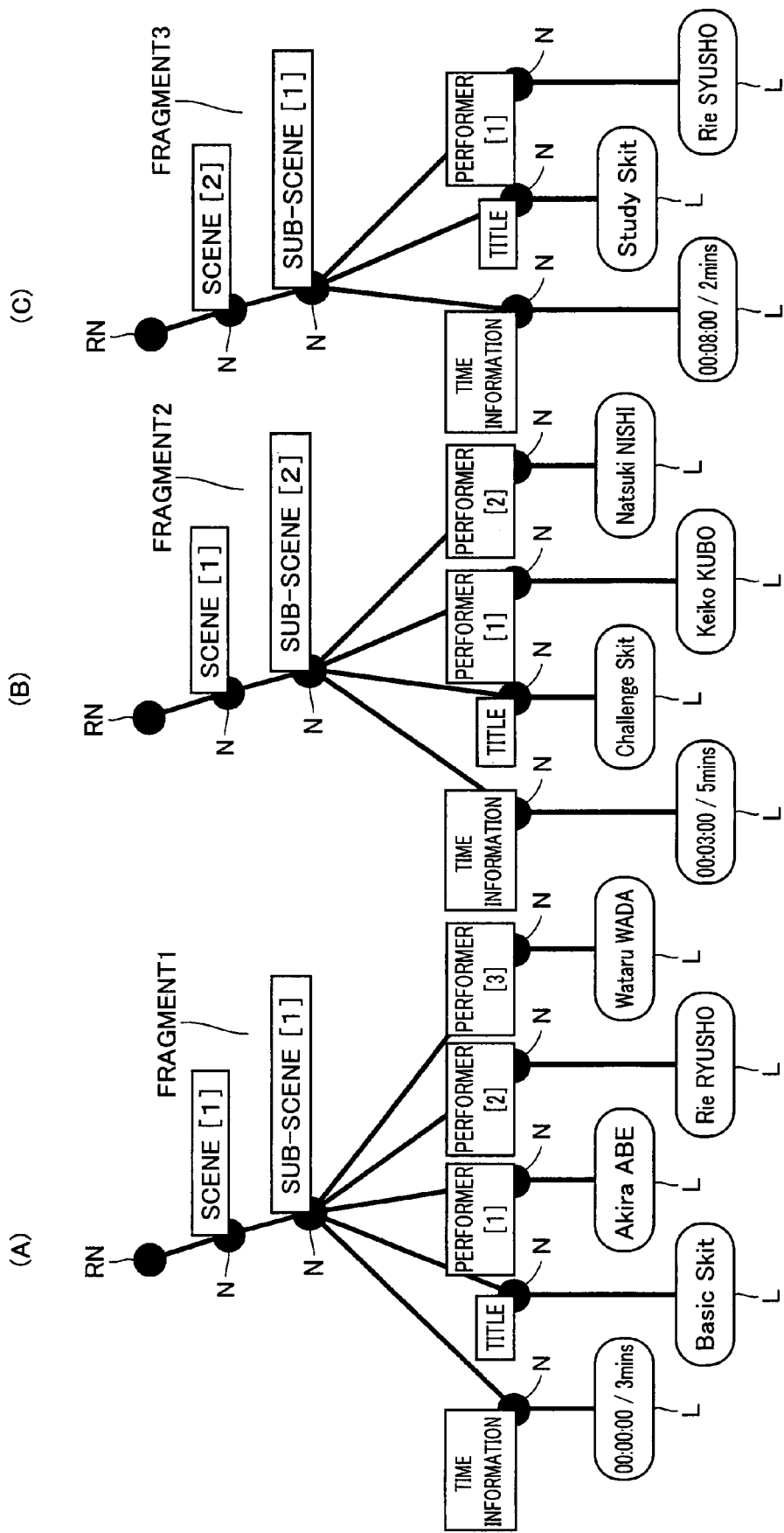
FIG. 18 shows partial trees obtained by dividing the tree-structure of FIG. 17.

Though the element information managed by the table is represented by the data of "performers" added to leaves L at the lowest level of FIG. 17 in this example, it is not limiting. It may be a leaf L at an arbitrary position, or, alternatively, the method of the present invention may be applied to an arbitrary node N included in the tree-structure shown in FIG. 17, regarding the node as tentative element information given as a set of element information hanging therebelow. Here, the information managed by the records in the table is the set of element information (actually a set of pieces of element information) corresponding to an arbitrary node N of the tree-structure and its position information.

FIRST EMBODIMENT

The information managing device in accordance with a first embodiment of the present invention will be described with reference to FIGS. 1 to 12 and FIG. 17. The information managing device in accordance with the first embodiment of the present invention includes an information table encoding device and an information table decoding device.

Figure 1:
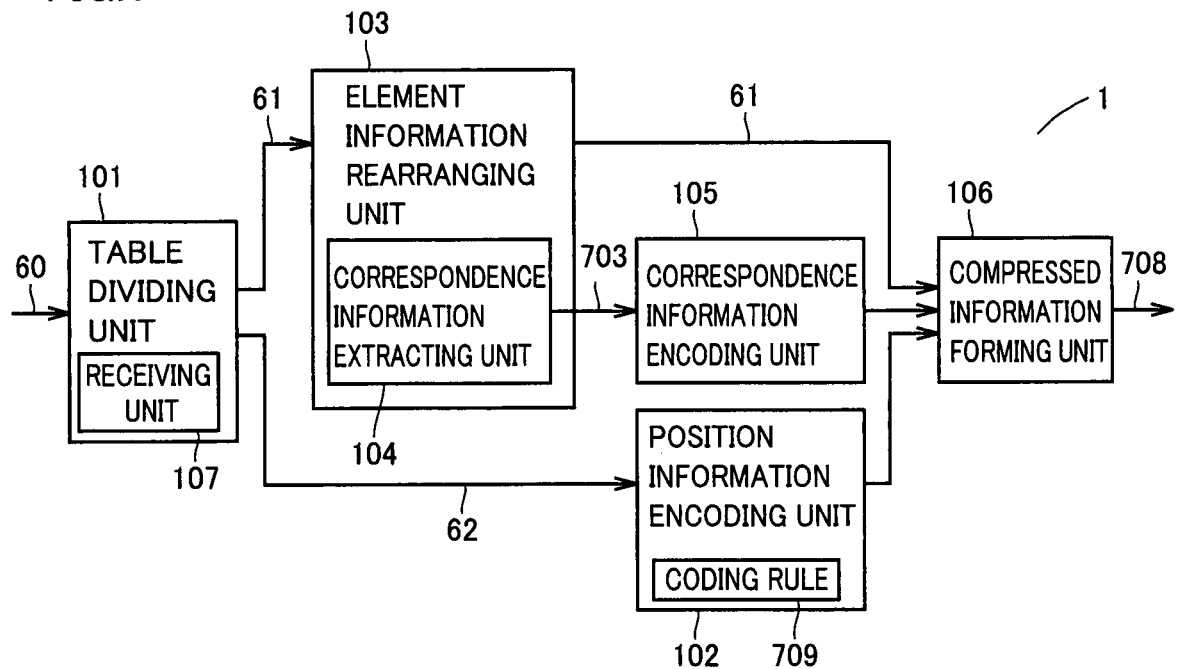
FIG. 1 is a schematic functional block diagram of an information table encoding device among the information managing devices in accordance with a first embodiment of the present invention.

FIG. 1 is a functional block diagram showing a schematic configuration of information table encoding device 1 among the information managing devices in accordance with a first embodiment of the present invention. Information table encoding device 1 includes a table dividing unit 101 having a receiving unit 107, a position information encoding unit 102, an element information rearranging unit 103 having a correspondence information extracting unit 104 therein, a correspondence information encoding unit 105 and a compressed information forming unit 106.

Figure 2:
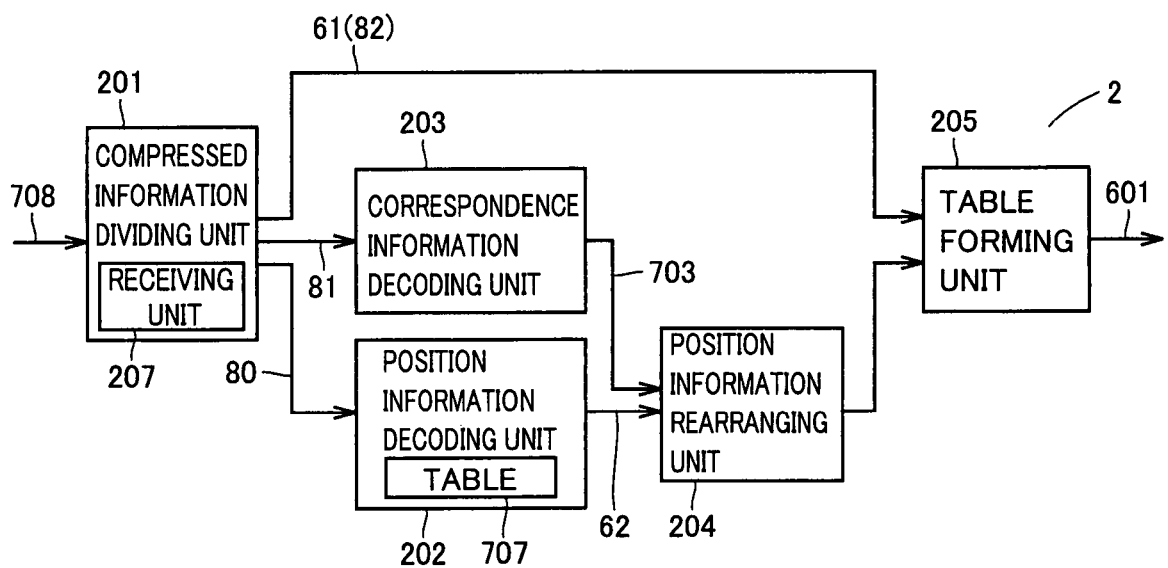
FIG. 2 is a schematic functional block diagram of an information table decoding device among the information managing devices in accordance with the first embodiment of the present invention.

FIG. 2 is a functional block diagram showing a schematic configuration of an information table decoding device 2 among the information managing devices in accordance with the first embodiment of the present invention. Information table decoding device 2 includes a compressed information dividing unit 201 having a receiving unit 207, a position information decoding unit 202 having a table 707, a correspondence information decoding unit 203, a position information rearranging unit 204 and a table forming unit 205.

In the following, an operation of the information managing device (information table encoding device 1 and information table decoding device 2) of the present embodiment will be described, using the additional information for the video image shown in FIG. 17 as an example. As can be seen from FIG. 17, additional information of the video image is given in a tree-structure that corresponds to the logic structure of the video image. Numbers "1", "2" and "3" added to type names "scene", "sub-scene" and "performer" of respective nodes in FIG. 17 are added as pieces of information for uniquely identifying the position of the corresponding nodes N in the tree-structure.

Naturally, the additional information of the actual video image is not limited to these, either in structure or contents. By way of example, it is possible to add, to the root node RN (the uppermost node of the tree) or to each node N representing a scene, a leaf representing corresponding video title or a scene title, to increase the number of levels of the tree by dividing a sub-scene to smaller sub-scenes, or to decrease the number of levels. The types of elements included in the additional information are not limited to those shown in FIG. 17, either. Further, other than the tree formed of a combination of scenes and sub-scenes (a tree describing one video image), a tree in which the root node RN represents all programs broadcast on a channel, each node N of the first level represents a program and each node N of the second level represents a scene included in the program, may be handled.

A table 60 of FIG. 3 includes a plurality of records. Each record stores a set of a value 61 of element information "performer" of the same type extracted from the additional information shown in FIG. 17 and position information 62 of the leaf L corresponding to the value 61 of the element information. In table 60 of FIG. 3, the tree of additional information shown in FIG. 17 is scanned successively from one end, and extracted pieces of the same type of element information "performer" are arranged directly in the order of appearance in the tree-structure. Specifically, values 61 of pieces of element information that appear when the tree-structure is scanned from the left to the right are stored successively from the top to the bottom of table 60, in accordance with the order of appearance. Specifically, position information 62 is represented by a combination of positions at the first to third levels (scene #, sub-scene # and performer #), and therefore, in table 60, position information 62 of the element information having the value 61 of "Akira ABE" is given by the value (1, 1, 1), while position information 62 of the element information having the value 61 of "Wataru WADA" is given by the value (1, 1, 3). To the nodes N belonging to one same level, values of the position information 62 are allotted starting from the left side of the tree, and therefore, the value of the leftmost element information 62 represents the minimum value (1, 1, 1) and the value of the rightmost element information 62 represents the maximum value (2, 1, 1).

In the present embodiment, table 60 shown in FIG. 3 is used as an input to information table encoding apparatus 1. Specifically, in the present embodiment, assuming that values of elements of one same type have already been selected and extracted from element information included in the additional information having the tree-structure, encoding of these values 61 of the element information and corresponding position information 62 will be described. Naturally, it is also possible to implement the information table encoding device 1 to have the functions of: selecting pieces of element information of the same type from the information having the tree-structure and forming a table for each type of the elements; and encoding the information representing the element type together and adding thus encoded information to the code sequence of element information value 61 and position information 62, to form compressed information. Similarly, it is also possible to implement the information table decoding device 2 as a functional unit decoding the information of element type, element information value 61 and position information 62 and forming tables for respective types of elements, which functional block is held by an information table decoding device of an upper level, not shown. Here, the table to be encoded refers to a data structure having the element information and the position information related in one-to-one correspondence to each other, and actually, it refers to data having such a structure as shown in FIG. 4 or 5.

Tables 63 and 64 of FIG. 4 have groups in which the value of element information and the corresponding position information are stored as a pair, for each type of the element information. Each group may have such a structure as shown in table 63 of FIG. 4(A), in which element information (value A1, value A2, . . . value B1, value B2, . . . ) and the corresponding position information (position information A1, position information A1, . . . position information B1, position information B2, . . . ) are paired, and the value of element information and the position information are arranged alternately. Alternatively, each group may have such a structure as shown in table 64 of FIG. 4(B), in which all pieces of element information are arranged successively, followed by all the corresponding pieces of position information arranged successively.

In tables 65 and 66 of FIG. 5, values of element information are stored in a different data structure separate from the position information. Therefore, the tables have such a data structure that reference information to make a reference to the value of element information stored in the separate data structure is paired with the position information of the value of element information and stored, for each type of element information. Table 65 of FIG. 5(A) has a structure in which the reference information for an element information value is paired with the corresponding position information, and the reference information and position information are arranged alternately. Table 66 of FIG. 5(B) has such a structure that all pieces of reference information to the element information are arranged successively, followed by all the corresponding pieces of position information arranged successively.

In order to perform the differential coding of position information as will be described later, the data structure shown in FIG. 4(B) or FIG. 5(B) is preferred, in which a plurality of pieces of position information are arranged successively. If it is possible to know the amount of codes related to the value of element information or the reference information for the element information, the data structure of FIG. 4(A) or FIG. 5(A), in which reference information and position information are arranged alternately, also allows differential coding of position information. Though data structures having the value of element information (or reference information for the value of element information) arranged first and followed by the corresponding position information are shown as examples in FIGS. 4 and 5, the data structure having the position information arranged first and followed by the corresponding value of element information (or reference information for the value of element information) may also be used.

(Operation of the Information Table Encoding Device)

Figure 6:
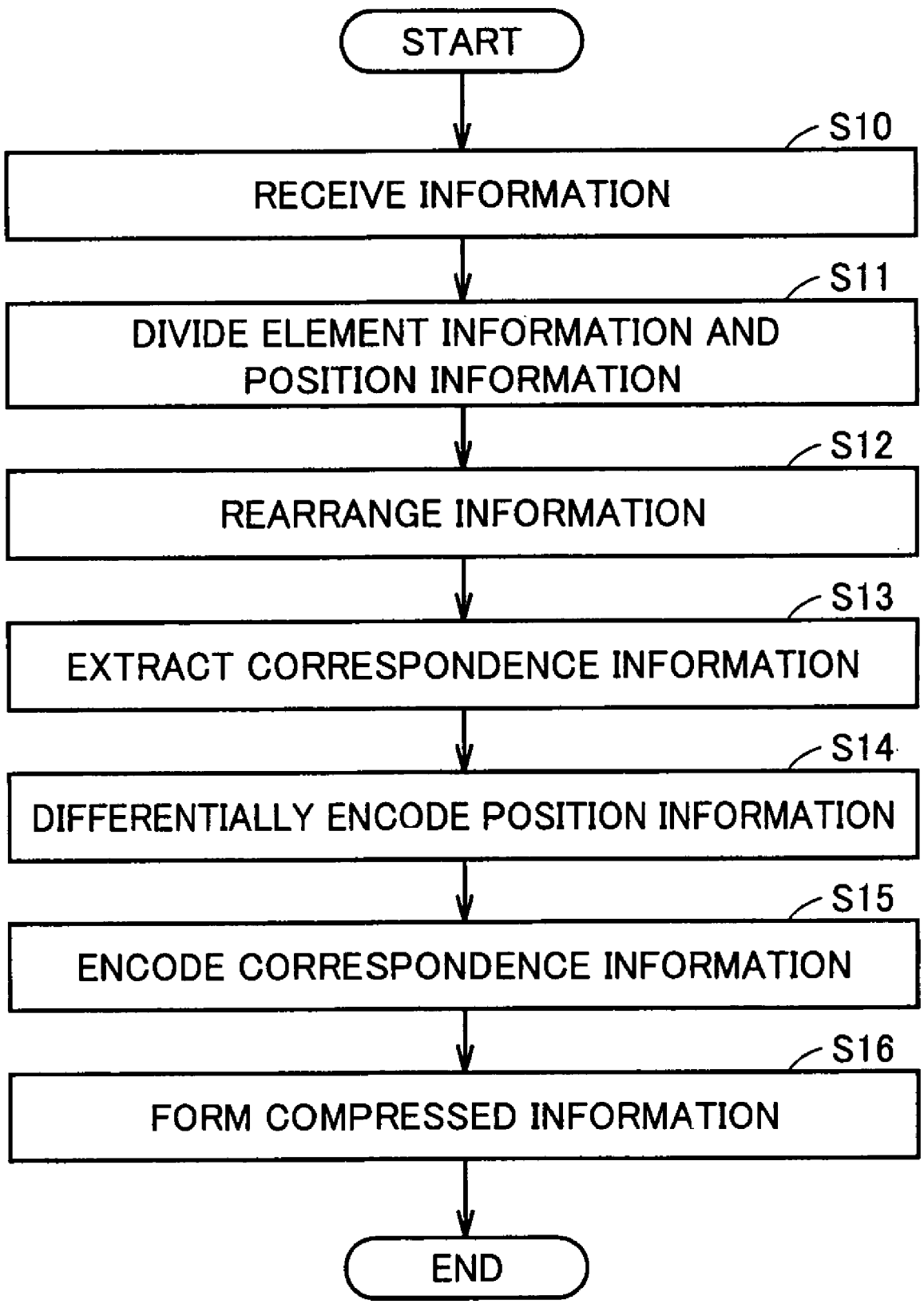
FIG. 6 is a flowchart representing a method of encoding an information table, among information managing methods in accordance with the first embodiment of the present invention.

An operation of encoding the table of information table encoding device 1 in accordance with the present embodiment will be described with reference to the flowchart of FIG. 6.

Table 60 of FIG. 3 (actually, the data having such a data structure as shown in FIG. 4 or 5), which is obtained in advance by extracting pieces of element information of the same type included in the information having the tree-structure, is received by receiving unit 107 (step S (hereinafter simply denoted by S) 10), and table dividing unit 101 divides the information of received table 60 into values 61 of element information and position information 62 and outputs the same (S11). Table 60 may not be prepared in advance and, in that case, it is naturally possible that the process of receiving additional information of tree-structure shown in FIG. 17, analyzing the types of element information contained therein and generating the table 60 of FIG. 3 by collecting pieces of element information of the same type, may be performed by table dividing unit 101.

Position information encoding unit 102 receives and encodes the position information 62 output from table dividing unit 101. Here, in table 60 of FIG. 3, a plurality of pieces of position information 62 are arranged from a small value to a large value (ascending order) similar to the order of appearance in the tree structure. Therefore, efficient encoding is possible, using the differential coding described in Patent Document 1. In the following, arrangement from small to large values will be referred to as magnitude order arrangement. Specific examples of coding will be described later with reference to FIGS. 9 and 10.

Element information rearranging unit 103 receives as inputs the values 61 of a plurality of pieces of element information output from table dividing unit 101. Then the input values 61 of the element information, which are arranged in the order of appearance in the tree-structure, that is, the order of values of position information as shown in table 60 of FIG. 3, are rearranged in lexicographic order (alphabetical order, or in the order of Japanese syllabary) (S12).

FIG. 7 shows a table 601 obtained after rearranging the information in table 60 of FIG. 3 by element information rearranging unit 103. Table 601 of FIG. 7 also corresponds to table 601 output from information table decoding device 2, which will be described later. The table used as the auxiliary information at the time of actual search is in the form having values 61 of element information arranged in lexicographic order, such as shown in FIG. 7. In other words, table 60 having values 61 of element information arranged in the order of appearance of the tree-structure shown in FIG. 3 corresponds to intermediate data prepared for encoding.

As can be seen from FIG. 7, position information 62 after rearrangement is not in the magnitude order of the values. Therefore, differential coding described above cannot directly be applied thereto. Therefore, correspondence information extracting unit 104 detects how the values 61 of element information were rearranged when table 60 of FIG. 3 was modified to table 601 of FIG. 7, and outputs information representing the result of detection as correspondence information 703 between the element information and the position information (S13). The process for generating correspondence information 703 is performed in synchronization with the rearrangement of element information 61, and therefore, correspondence information extracting unit 104 is provided as an internal element of element information rearranging unit 103.

FIG. 8(A) shows an exemplary course of process for obtaining correspondence information 703 of FIG. 8(B). FIG. 8(A) shows values 61 of element information before rearrangement of FIG. 3 as the element information 701, and values 61 of element information after rearrangement of FIG. 7 as element information 702, respectively. In the process, first, as shown on the left part of the figure, serial numbers (1) to (6) are allotted to respective pieces of element information 701 before rearrangement (step S (hereinafter simply denoted by S) 1). Next, the pieces of element information 701 with serial numbers allotted are rearranged to the lexicographic order (S2). The arrangement of serial numbers of the pieces of element information 702 after rearrangement will be (1), (4), (5), (2), (6) and (3). Namely, the correspondence information 703 of FIG. 8(B) represents the arrangement of these serial numbers representing the result of rearrangement. Naturally, the correspondence information 703 is not limited to the one given in the form of serial numbers as described above, and it may be any information that can represent how the values 61 of element information have been rearranged. Even when the correspondence information 703 based on the serial numbers is used, the manner of allotting correspondence information 703 or the method of extracting the correspondence information is not limited to these described above and various other implementations are possible.

Next, position information encoding unit 102 receives as an input the position information 62 output from table dividing unit 101, performs differential coding on the input position information 62 and outputs the result (S14). Correspondence information encoding unit 105 receives as inputs the correspondence information 703 extracted (generated) at correspondence information extracting unit 104, encodes the input correspondence information 703 and outputs the result (S15). Finally, compressed information forming unit 106 receives as inputs the encoded position information 62, encoded correspondence information 703 and values 61 of element information after rearrangement, output from position information encoding unit 102, correspondence information encoding unit 105 and element information rearranging unit 703, respectively, and forms and outputs compressed information 708 having these pieces of input information arranged in a prescribed format (S16). Compressed information 708 (information provided by compression coding of table 601 as auxiliary information at the time of a search) output from information table encoding device 1 is used at the time of transmitting or storing table 601 to reduce the amount of data to be transmitted or to be stored, to enable more efficient management of table 601.

In the present embodiment, compression coding of value 61 of element information itself is not described. It goes without saying, however, that coding of value 61 of element information, together with coding of position information 62 and correspondence information 703, is effective to improve efficiency at the time of transmitting or storing table 601. The element information shown in table 601 is text information. Therefore, compression by common text coding or compression using existing compression tool such as Zip compression is available.

Further, as the values 61 after rearrangement are in the lexicographic order, it is possible to process pieces of element information having the same value 61 collectively, or to apply differential coding. As an example of the former process, pieces of element information having the same value 61 are encoded using the value 61 and the number of pieces of the element information having the value. For instance, in table 601 of FIG. 7, there are two pieces of element information having the value 61 of "Rie RYUSHO". Therefore, by recording "Rie RYUSHO" only one in stead of recording "Rie RYUSHO" twice and additionally recording information of occurrence number "2" at the time when the compressed information is formed, the amount of data necessary for recording table 601 can be reduced. The method of encoding values 61 of element information is naturally not limited to this example. Further, if the element information has an attribute other than the text information, a method of encoding suitable for that attribute is adopted. Details of such methods will not be described here.

In this manner, by applying the values 61 of element information after compression coding to compressed information forming unit 106, or by performing compression coding of values 61 of element information at compressed information forming unit 106 and using the result for forming the compressed information 708, the amount of data of compressed information 708 can further be reduced.

Figure 8:
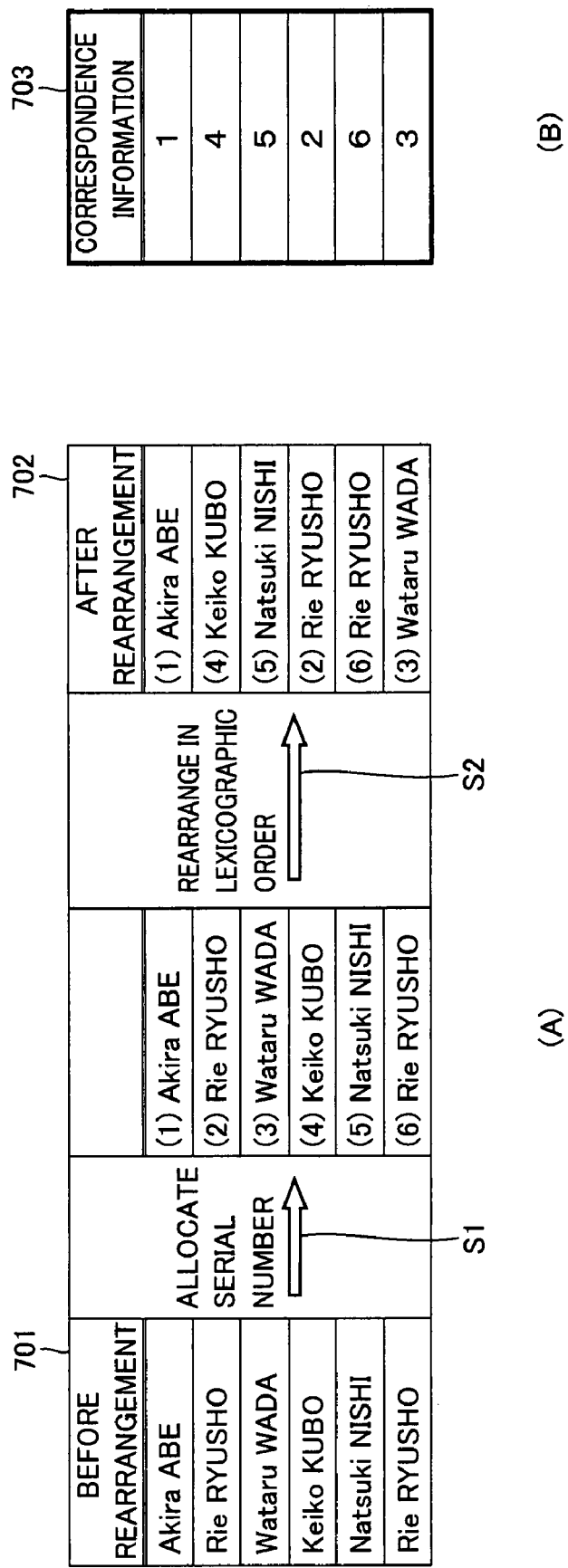
FIG. 8 illustrates a process for extracting correspondence information in accordance with the first embodiment.

A specific example of encoding in accordance with the present embodiment will be described using FIGS. 9 and 10, with reference to FIGS. 3, 7 and 8. It is noted, however, that encoding of element information is not discussed here. Encoding of position information 62 and correspondence information 703 will be described, and particularly, the amount of codes after encoding will be evaluated.

First, an example in which position information 62 is encoded by a common method without differential coding will be described. Information of table 601 shown in FIG. 7 is used as the auxiliary information at the time of searching. In table 601, pieces of position information 62 are not arranged in the magnitude order of the values of position information, and therefore, encoding is done by a common method.

Assume that a value of one level of position information 62 is encoded by 5 bits. Position information 62 shown in FIG. 7 is given using values of three levels, and therefore, 5×3=15 bits are necessary to represent one piece of position information 62, for encoding. Table 601 contains 6 pieces of position information 62, and therefore, the total of 15×6=90 bits is the amount of codes necessary for the position information 62 when rearrangement is not performed (in this case, correspondence information 703 is unnecessary).

It is noted that the number of bits necessary to represent one level depends on the number of nodes N (child node) that is connected to and can be branched from one node N (parent node) of immediately upper level, and 5 bits mentioned above corresponds to an example allowing branching of fifth power of 2, that is, branching up to 32. Additional information of actual video images requires larger number of bits.

Next, an example of encoding of position information 62 by the method of differential coding described in Patent Document 1 will be described. Here, the position information 62 arranged in the order of table 60 shown in FIG. 3 is subjected to differential coding.

Figure 9:
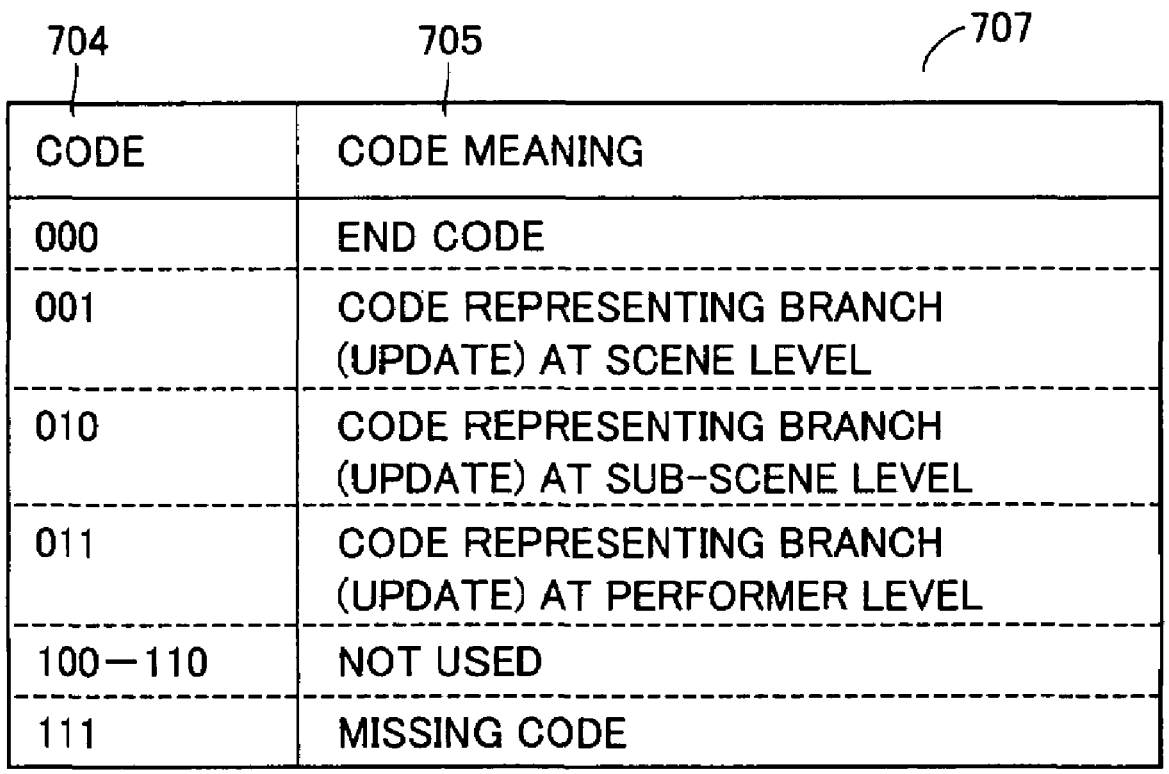
FIG. 9 shows examples of position information codes used for differentially coding position information.

FIG. 9 shows, in the form of a table, meanings 705 of codes 704 for each of the codes 704 used in differential coding of position information 62 in accordance with the present embodiment. FIG. 10 shows a code sequence 706 obtained by encoding position information 62 of FIG. 3, in comparison with the position information 62 to be encoded. Position information encoding unit 102 has coding rule data 709 representing rules for encoding position information 62. Position information encoding unit 102 encodes position information 62 with reference to coding rule data 709, in accordance with the method described in Patent Document 1. Specifically, the position information 62 stored at the head of table 60 is encoded by the common method, and thereafter, the following pieces of stored position information 62 are encoded by using the difference representing at which level the information has been branched, that is, which level value is updated (incremented), using code 704.

When position information 62 of FIG. 3 is encoded by position information encoding unit 102, the result is as follows. Specifically, the position information 62 stored at the head of table 60 is encoded using 15 bits (5 bits per 1 level×3 levels) (see the leftmost code sequence 706 of FIG. 10), and the following 5 pieces of stored position information 62 are encoded by a code 704 of 3 bits, and given as code sequence 706 in FIG. 10. The number of bits "3" here is determines as the minimum number of bits=3, that can represent <number of levels>3+<end code>1+<missing code>1=5. Finally, a code 704 representing an end code of 3 bits (see the rightmost code sequence 706 of FIG. 10) is added. Therefore, all pieces of position information 62 stored in table 60 of FIG. 3 can be differentially coded in 15+3×6=33 bits (see FIG. 10).

Figure 10:
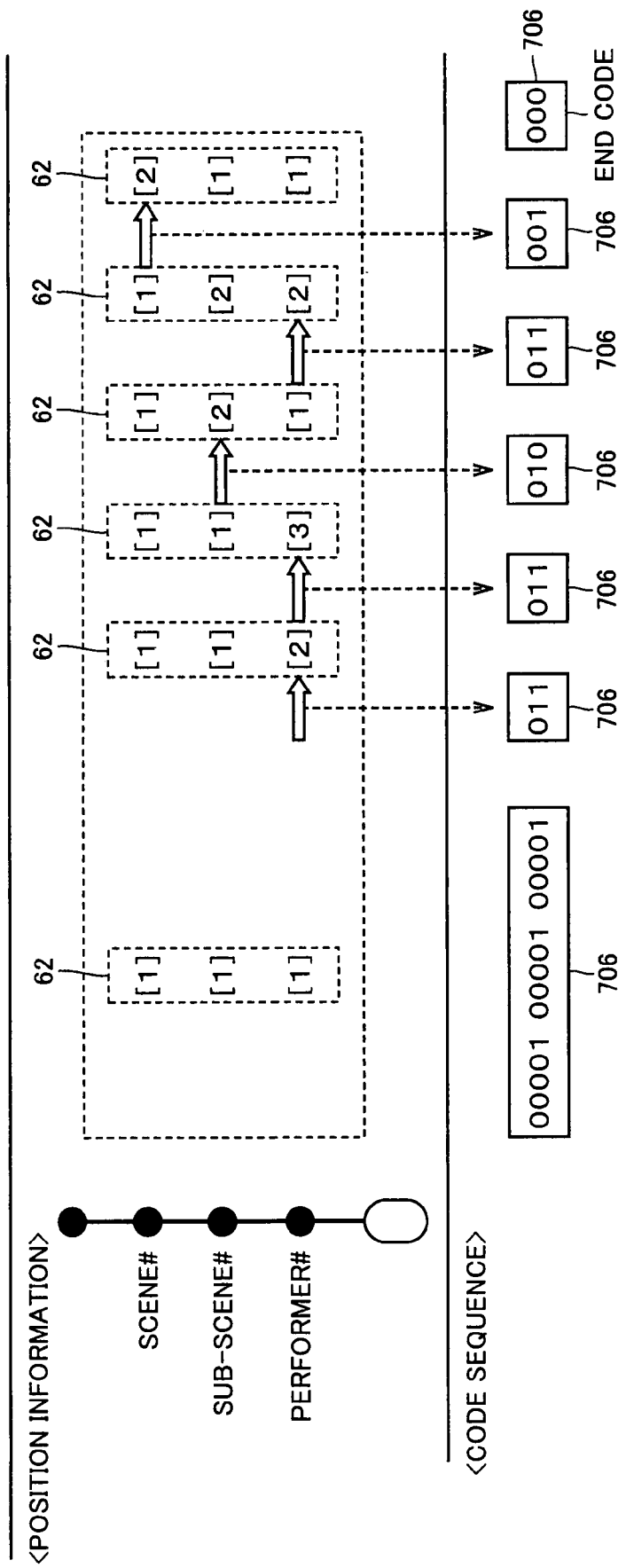
FIG. 10 shows, along with the position information, code sequence of differentially coded position information.

Next, at compressed information forming unit 106, to the code sequence 706 of FIG. 10, correspondence information 703 shown in FIG. 8(B) after encoding by correspondence information encoding unit 105 is added. Since the total number of pieces of position information 62 in table 60 is 6, a piece of information (numerical value) of correspondence information 703 that corresponds to one piece of position information 62 can be encoded by 3 bits, that is, the minimum bit number that can represent the total number of values. The total number of values is included in the compressed information, by the coding of position information 62 at position information encoding unit 102. In order to encode 6 pieces of correspondence information 703 same in number as the number of pieces of position information 62 in table 60, the correspondence information 703 of FIG. 8(B) is encoded by 3×6=18 bits, by correspondence information encoding unit 105. Therefore, the total number of bits is 33 bits of the amount of position information codes+18 bits of the amount of correspondence information codes=51 bits.

As described above, the amount of codes when position information 62 is encoded without differential coding is 90 bits, while the amount of codes when the position information 62 is differentially coded and correspondence information 703 is coded is 51 bits. Therefore, when position information 62 is encoded using the difference information and correspondence information 703 as in the present embodiment, the amount of codes can be made smaller (ratio of compression can be made higher) than the conventional method not using the differential coding. The numerical values described above are an example, and when the number of pieces of position information 62 as the object of coding or the number of levels represented by the position information 62 increases, the effect of compression will be more significant. Further, the method of encoding correspondence information 703 described above is only an example and not limiting, and a method of encoding having higher efficiency may be applied. When the correspondence information 703 is encoded by a method of higher efficiency, the effect of compression can further be improved.

Figure 11:
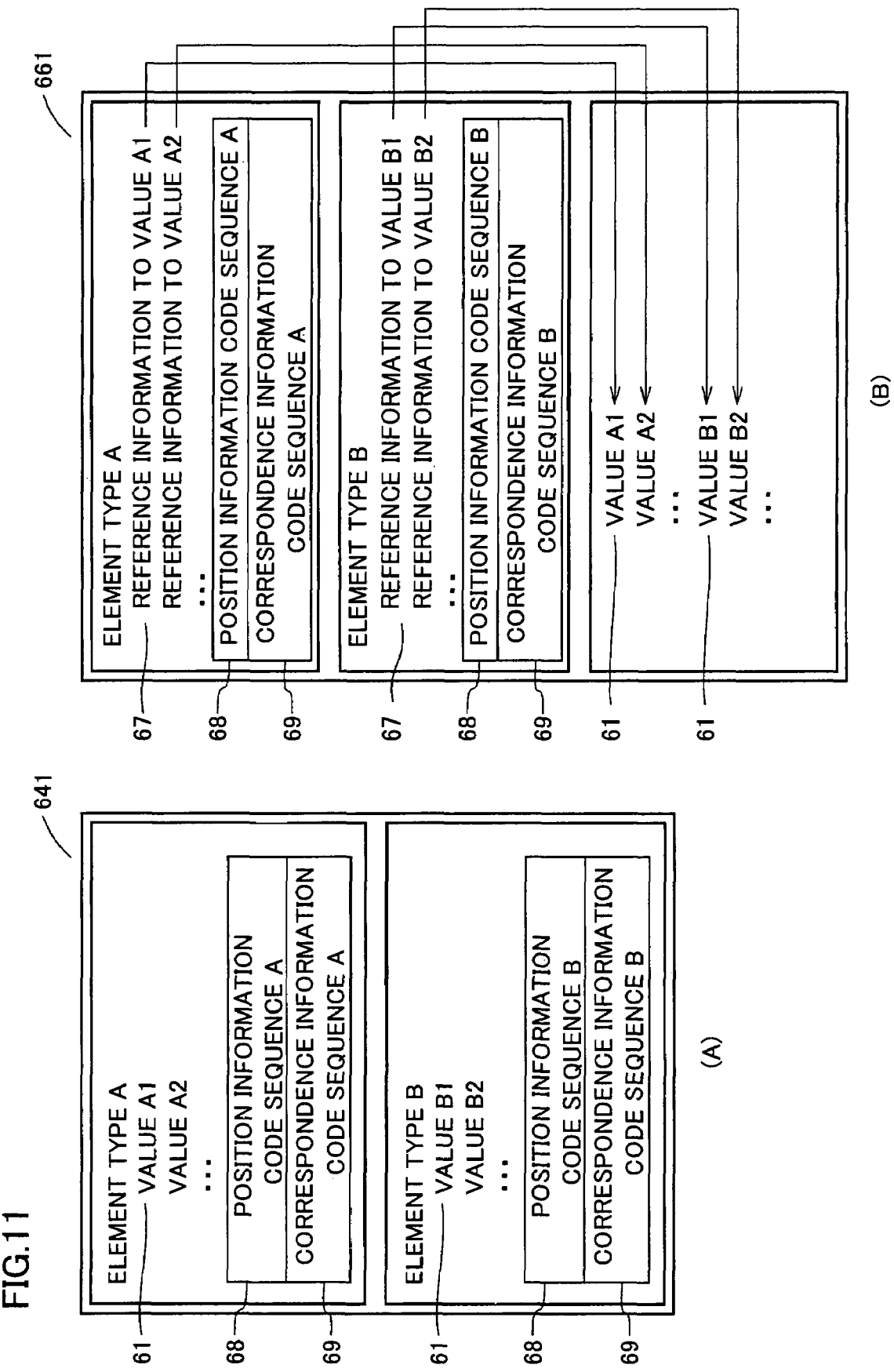
FIG. 11 illustrates data structure of compressed information, encoded by the information table encoding device in accordance with the first embodiment of the present invention.

FIG. 11 schematically shows an exemplary data structure of the compressed information in which the information in the form of a table is encoded in accordance with the present embodiment. FIG. 11(A) represents data structure of the compressed information obtained by encoding data of FIG. 4(B), and FIG. 11(B) represents data structure of the compressed data obtained by encoding data of FIG. 5(B). In respective tables of FIG. 11, a plurality of pieces of successive position information is replaced by the "position information code sequence" and the "correspondence information code sequence." As already described, in the present embodiment, encoding of values 61 of element information will not be discussed in detail, and therefore, the values (value A1, value A2, . . . value B1, value B2, . . . ) of FIGS. 4(B) and 5(B) are shown without any modification, in FIG. 11. It is noted, however, that these values may be each encoded and recorded. Alternatively, by applying differential coding, values 61 of a plurality of successive pieces of element information may be replaced by a "value code sequence", to form the compression information. In the data structures of tables 641 and 661 shown in FIG. 11, values 61 of element information (or reference information 67 for the values 61 of element information) are arranged first, followed by position information code sequence 68 and correspondence information code sequence 69. The tables may have a data structure in which position information code sequence 68 and correspondence information code sequence 69 are arranged first followed by values 61 of element information (or reference information 67 for the values 61 of element information). Further, whichever of position information code sequence 68 and correspondence information code sequence 69 may come first, and the values 61 of element information (or reference information 67 for the values 61 of element information) may be positioned between position information code sequence 68 and correspondence information code sequence 69.

(Operation of Information Table Decoding Device)

An operation of information table decoding device 2 in accordance with the present embodiment will be described with reference to the flowchart of FIG. 12.

Compressed information dividing unit 201 receives compressed information 708 as an input through receiving unit 207 (step S (hereinafter simply denoted by S) 20), divides the input compressed information 708 into a code sequence 80 of position information 62, a code sequence 81 of correspondence information 81 and values 61 of element information (or a code sequence 82 of values 61 of element information), and outputs the same (S21).

Position information decoding unit 202 receives the code sequence 80 of position information 62 output from compressed information dividing unit 201, and differentially decodes the received code sequence 80 with reference to table 70, in accordance with the method described in Patent Document 1 (S22). Differential decoding refers to decoding of data encoded by the method of differential coding.

The process of differential decoding will be described with reference to FIG. 10. First, the first 15 bits of code sequence 706 of position information 62 are read and interpreted, whereby position information (1, 1, 1) stored at the head of table 60 is decoded. Next, from the following code sequence 706 of position information, codes 704 are read 3 bits by 3 bits successively, and interpreted. The code 704 of the first 3 bits of position information 62, that is, "011" is interpreted as a code representing a branching (updating) at the level of performers, according to table 707 of FIG. 9. Therefore, the value of the performer level is updated by 1 from the first decoded position information (1, 1, 1), to obtain the second piece of position information (1, 1, 2). The next position information code 704 is also "011" and, therefore, the third piece of position information is (1, 1, 3). The position information code 704 that is read next is "010", which is interpreted as a code representing a branching (updating) at the level of sub-scene, according to table 707 of FIG. 9. Here, when there is a branch at the sub-scene level, nodes lower than the branch, that is, the nodes of performers in the present embodiment, comes to be elements hanging from another sub-scene, and therefore, values thereof are counted anew from 1. Therefore, the value of sub-scene level is updated by 1, and the value of the performer level is returned to 1. Thus, the fourth position information will be (1, 2, 1). Through similar processing, (1, 2, 2) and (2, 1, 1) are obtained as the result of decoding. Finally, the position information code 704 of "000" is read. According to table 707 of FIG. 9, this is interpreted as an end code instructing termination of decoding. Therefore, in response to the reading of this end code, decoding ends.

According to the procedure described above, the plurality of decoded pieces of position information 62 output from position information decoding unit 202 are output in accordance with the magnitude of the values of position information 62 (in the order of stored values from the head of table 60 of FIG. 3).

Correspondence information decoding unit 203 receives a code sequence 81 of correspondence information 703 from compressed information dividing unit 201, and decodes the received code sequence 81 to correspondence information 703 to be output (S23).

Position information rearranging unit 204 receives as inputs the correspondence information 703 as the result of decoding output from correspondence information decoding unit 203 and values of position information 62 as the result of decoding output from position information decoding unit 202, and rearranges the order of input values of position information 62 in accordance with the input correspondence information 703 (S24).

By way of example, assume that for the values of position information 62 decoded in the order shown in table 60 of FIG. 3, correspondence information 703 of FIG. 8(B) is decoded. Here, position information rearranging unit 204 arranges the decoded (input) pieces of position information 62 in accordance with the order indicated by the numerical values of the decoded correspondence information 703. First, as the first value of decoded correspondence information 703 of FIG. 8(B) is "1", the first decoded piece of position information (1, 1, 1) is determined and output as the first piece of position information 62. Next, as the second value of correspondence information 703 is "4", the fourth decoded piece of position information (1, 2, 1) is determined and output as the second piece of position information 62. Next, as the third value of correspondence information 703 is "5", the fifth decoded position information (1, 2, 2) is determined and output as the third piece of position information 62. In the similar manner, based on the values "2", "6" and "3" of correspondence information 703, corresponding pieces of position information (1,1,2), (2, 1, 1) and (1, 1, 3) are determined and output as the fourth, fifth and sixth pieces of position information 62. In this manner, the position information 62 is determined and output successively.

Finally, table forming unit 205 arranges the values 61 of element information output from compressed information dividing unit 201 and the pieces of position information 62 output in the above-described order from position information rearranging unit 204 in a corresponding form, so that table 601 having the values 61 of element information arranged in the lexicographic order as shown in FIG. 7 is formed and output (S25).

Information table decoding device 2 decodes information 708 of table 60 that has been subjected to compression coding at the time of transmission or storage, and provide decoded table 601 as auxiliary information as an aid for a search. By way of example, information table decoding device 2 is mounted on an information terminal of a user having a search function based on additional information, and used for decoding compressed information 708 (information obtained by compression coding of table 601 as auxiliary information as an aid for a search) received by the information terminal through a transmission path. Table 601 formed by decoding has pieces of position information 62 rearranged from the magnitude order to the order corresponding to the element information 61 and the values 61 of element information arranged in the lexicographic order. After decoding, the user searches for the desired element information using this table 601, determines the necessary partial tree (fragment), and obtains the corresponding fragment. This is because lexicographic ordering is more advantageous, that is, allows more efficient and high-speed search, when the user performs a search, using table 601 output from the information managing device.

Figure 12:
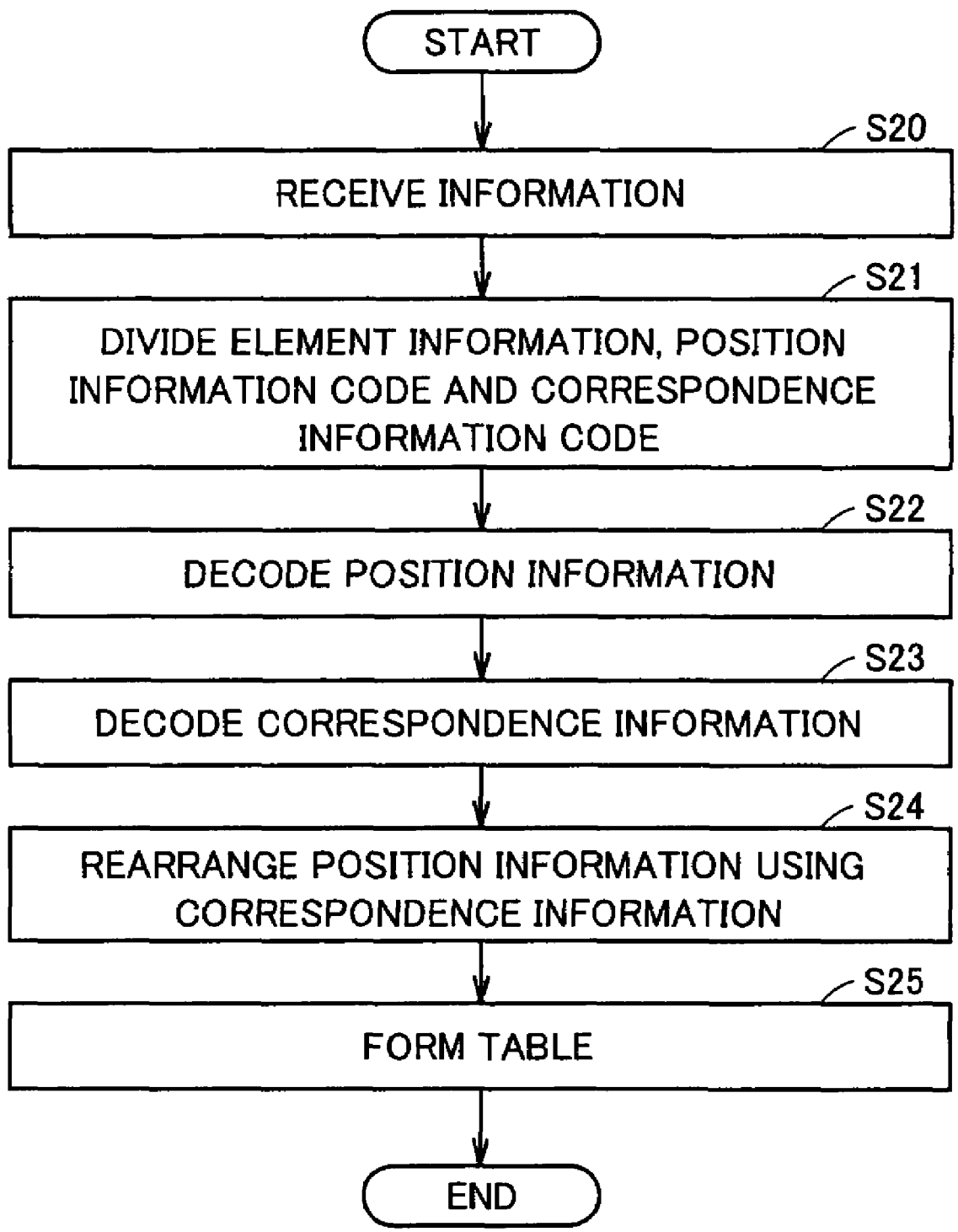
FIG. 12 is a flowchart representing an information table decoding method among the information managing methods in accordance with the first embodiment of the present invention.

Though decoding of position information 62 is performed earlier than decoding of correspondence information 703 in the example of FIG. 12, either of these decoding processes may be performed first, or these processes may be performed simultaneously in parallel.

SECOND EMBODIMENT

The information managing device in accordance with a second embodiment of the present invention will be described with reference to FIGS. 13, 14 and 15. The information managing device in accordance with the second embodiment includes an information table encoding device and an information table decoding device. Of these, the information table decoding device is the same as information table decoding device 2 of FIG. 2 described with reference to the first embodiment, and therefore, description thereof will not be repeated here.

Figure 13:
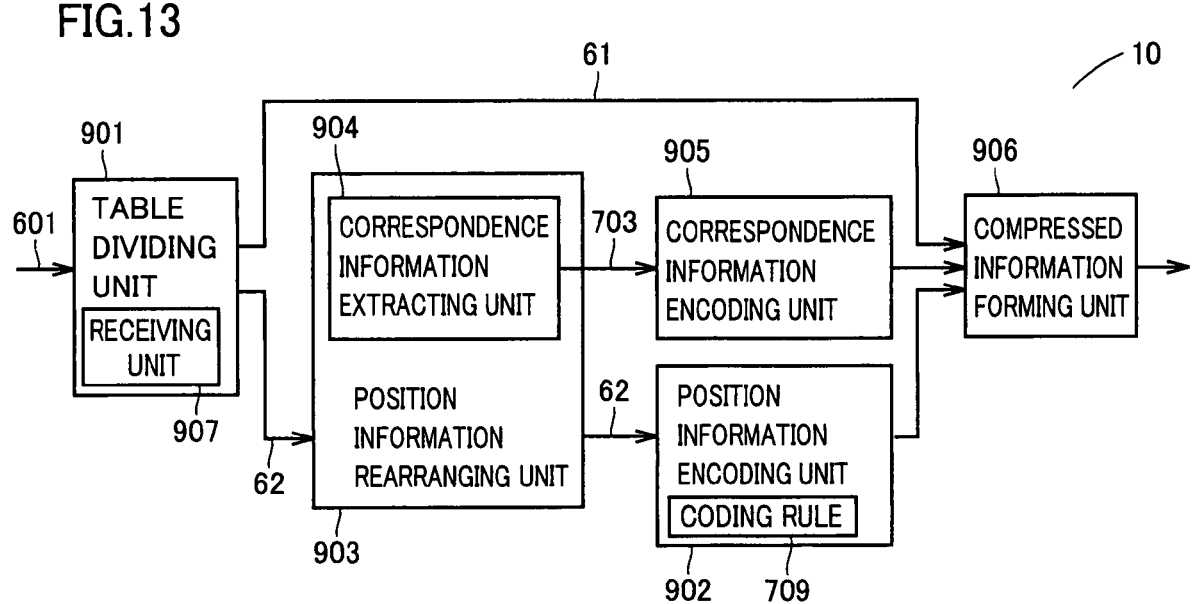
FIG. 13 is a schematic functional block diagram of an information table encoding device among the information managing devices in accordance with a second embodiment of the present invention.

FIG. 13 is a functional block diagram of an information table encoding device 10 of the information managing device in accordance with the second embodiment of the present invention. Information table encoding device 10 includes a table dividing unit 901 having a receiving unit 907, a position information encoding unit 902, a position information rearranging unit 903 having a correspondence information extracting unit 904, a correspondence information encoding unit 905, and a compressed information forming unit 906. Of these, table dividing unit 901 having receiving unit 907, position information encoding unit 902, correspondence information encoding unit 905 and compressed information forming unit 906 have the same functions as table dividing unit 101 having receiving unit 107, position information encoding unit 102, correspondence information encoding unit 105 and compressed information forming unit 106 shown in FIG. 1 of the first embodiment, and therefore, in the following, description of the present embodiment will be given mainly focusing on the difference from the first embodiment.

In the first embodiment above, when table 60 is formed by extracting only the element information of prescribed type from the additional information of video image shown in FIG. 17, it is assumed that the tree-structure is scanned from the upper level to the lower level and, at one same level, scanned from the left to the right, while pieces of element information of the prescribed type are extracted in the order of appearance in the tree-structure and stored in order in table 60 (see FIG. 3). Therefore, information table encoding device 1 of the first embodiment (see FIG. 1) has a functional unit, that is, element information rearranging unit 103, for rearranging the values 61 of element information, which have been divided and output, into lexicographic order in accordance with the format to be used as the auxiliary information at the time of searching, after various pieces of information including the values 61 of element information are divided and output from table 60.

In contrast, according to the second embodiment, when table 60 is formed by extracting values 61 of element information of the prescribed type from the additional information of the video image shown in FIG. 17, the tree-structure as a whole is scanned in advance, and at the step of extracting values 61 of element information of the prescribed type, the values are extracted in the lexicographic order and table 60 is formed. Specifically, table 601 having values 61 of element information arranged in the lexicographic order such as shown in FIG. 7 is provided as an input to information table encoding device 10 of the second embodiment (see FIG. 13). Here, as the values 61 of element information are already arranged in the lexicographic order, element information rearranging unit 103 of the first embodiment becomes unnecessary in information table encoding device 10. In contrast, pieces of position information 62 are not in the magnitude order of the values represented by the values in table 601 to be input. Therefore, information table encoding device 10 (FIG. 13) of the present embodiment includes a functional unit, that is, position information rearranging unit 903, for rearranging values represented by the pieces of position information 62 (numerical values) to the magnitude order, in order to enable differential coding of positional information 62.

The operation will be described in accordance with the flowchart of FIG. 6, with reference to FIG. 13.

First, table 601 is received as an input by receiving unit 907 (S10). Table dividing unit 901 reads values 61 of element types and position-information 62 from the input table 601, divides these and outputs (S11).

Position information rearranging unit 903 receives as inputs the plurality of pieces of position information 62 output from table dividing unit 901, rearranges the input plurality of pieces of position information 62 in the magnitude order of respective numerical values, and then outputs the result to position information encoding unit 905 (S12). At this time, correspondence information extracting unit 904 in position information rearranging unit 903 detects how the position information has been rearranged, and based on the result of detection, extracts, from the input information, correspondence information 703 representing correspondence between the values 61 of element information and position information 62 after rearrangement, and outputs the same (S13).

Figure 15:
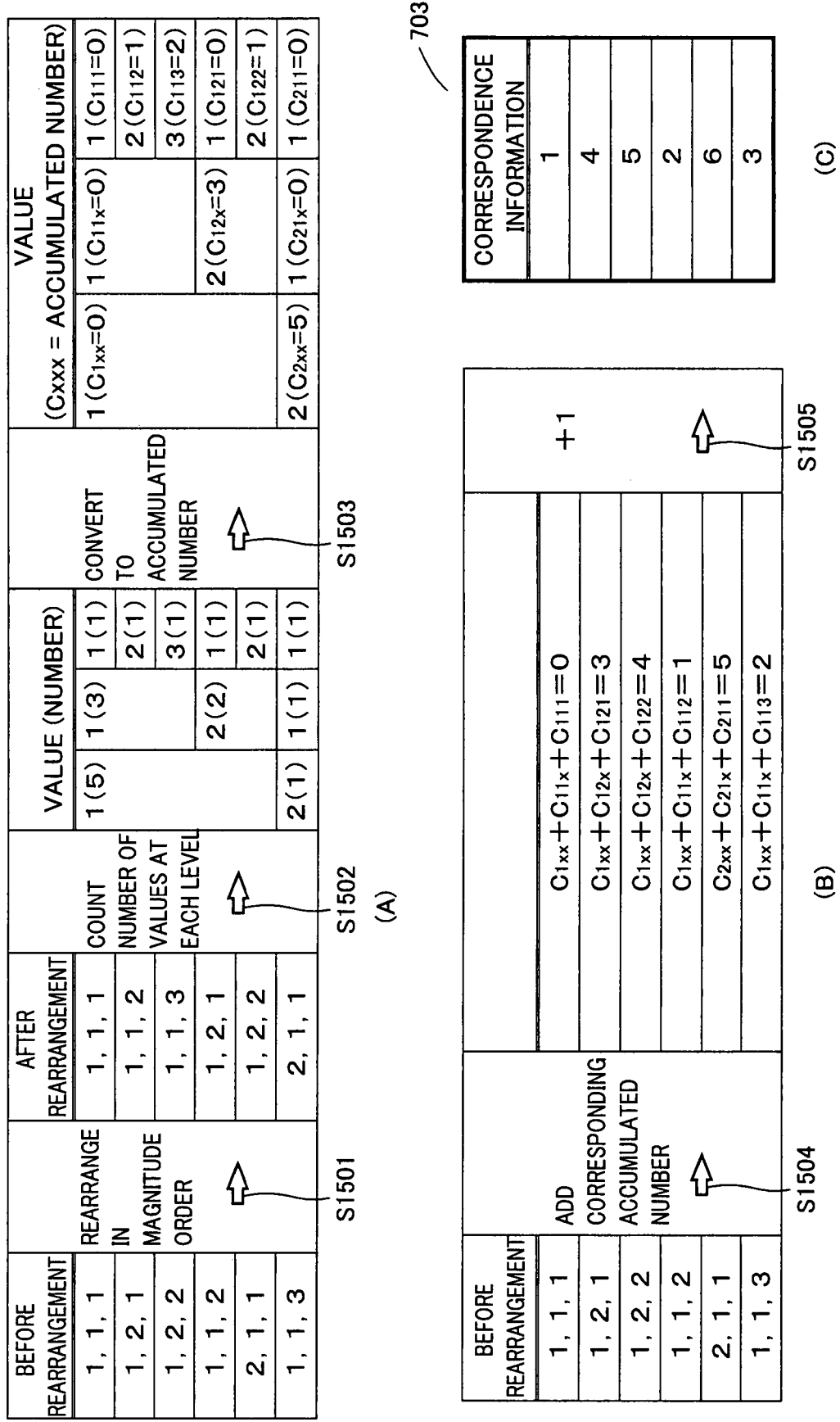
FIG. 15 shows another example of a process for extracting correspondence information in accordance with the second embodiment.

FIGS. 14 and 15 show methods of extracting (generating) correspondence information 703 from position information 62 at the time of rearrangement of position information 62. FIG. 14(A) shows an example in which serial numbers are allotted to the input plurality of pieces of position information 62 (read from table 601 of FIG. 7) in the order of values represented by each piece of position information 62 (numerical values) starting from the smallest one, to find the correspondence information 703 (see FIG. 14(B)) between the values 61 of element information and the position information 62 as rearranged.

It is noted that in the example of FIG. 14(A), in the step of allotting serial numbers to the pieces of position information 62, it is necessary to perform determination of magnitude on each numerical value. Therefore, a high-speed rearrangement process utilizing an existing sort algorithm cannot successfully be applied to the process procedure of FIG. 14(A). For this reason, the example of FIG. 14(C) is proposed, which is to effectively utilize the existing high-speed rearrangement process. In the example of FIG. 14(C), the process step of allotting serial numbers to the pieces of position information 62 in the order of arrangement in table 601 is performed twice (see steps S1401 and S1403), and the process step of sorting in which the pieces of position information 62 are rearranged in magnitude order of their values is performed twice (see steps S1402 and S1404). As a result, correspondence information 703 of FIG. 14(D) is output.

Further, FIG. 15 shows a method in which the correspondence information 703 is obtained through calculation, based on the number of appearance of the values of position information 62 at each level. In this method, first, the pieces of position information 62 are rearranged in the magnitude order of the values (numerical values) (step S1501) and, thereafter, the number of appearance of each value at each level of the rearranged position information 62 is counted successively, starting from the upper level (step S1502). From the result, it can be seen that the number of value "1" is 5 and the number of value "2" is 1 at the highest level (scene level). Of the five pieces of position information 62 having the value "1" at the highest level, the count of these having the value "1" at the second level (sub-scene level) is 3, and these having the value "2" is 2. Next, from the number of appearance of a certain value at each level, the number of pieces of position information 62 that have already appeared before the appearance of the value of interest is calculated as an accumulation value Cxxx (step S1503).

According to the process of step S1502, there is no piece of position information 62 that exists before the first appearance of value "1" at the highest level (scene level). Therefore, the accumulation value C1xx is 0. Before the first appearance of the value "2" at the highest level (scene level), there are 5 pieces of position information 62 that have the value "1". Therefore, the accumulation number C2xx is 5. Similarly, of the five pieces of position information 62 having the value "1" at the highest level, none exists before the piece of position information 62 having the value "1" first appears at the second level (sub-scene level). Therefore, the accumulation number C11x is 0. Of the five pieces of position information 62 having the value "1" at the highest level, three assumes the value "1" at the second level before the piece of position information 62 having the value "2" first appears at the second level (sub-scene level). Therefore, the accumulation number C12x is 3.

When respective accumulation values Cxxx are obtained in this manner as shown in step S1503, a sum of accumulation numbers Cxxx corresponding to the value of each level is calculated, for each piece of position information 62 before rearrangement as shown in FIG. 15(B) (step S1504). Each sum obtained at step S1504 represents the number of pieces of position information 62 that exists preceding the piece of position information 62 of interest, and therefore, in order to count the piece of position information 62 of interest itself, "1" is added to the corresponding sum (step S1505). Thus, the correspondence information 703 of FIG. 15(C) is output.

Needless to say, the correspondence information 703 is not limited to the one given by the serial number allotted to the pieces of position information 62 described above, and it may be any information that can represent the manner how the position information 62 has been rearranged. Further, when correspondence information 703 is given based on serial numbers, the manner of establishing correspondence or the method of extracting correspondence information 703 is not limited to those described above, and various other methods may be available.

Contents of subsequent differential coding by position information encoding unit 902 (S14), encoding of correspondence information 703 by correspondence information encoding unit 905 (S15) and formation of compressed information by compressed information forming unit 906 (S16) described with reference to the first embodiment are directly applicable to the second embodiment. Therefore, accumulative description will not be given here.

Even when the values 61 of element information are given not by the text information such as shown in the embodiments above, the information managing device and method described above are applicable. According to the present invention, when values 61 of element information and position information 62 in table 60 (or table 601) as the object of transmission or storage, or more generally, when a plurality of first elements and corresponding plurality of second elements managed in the form of a table 60 (or 601) are characterized in that search efficiency or encoding efficiency is maximized if these elements are respectively arranged in accordance with different orders, these elements are rearranged in an order that is suitable for the characteristic of either one of the elements, and thereafter, the other element is rearranged in an order that is suitable for its characteristic. In addition, the correspondence information representing the correspondence between the two elements after rearrangement is generated and added to each of the rearranged elements, whereby it becomes possible to handle both elements arranged in the order suitable for respective characteristics. As described in the first and second embodiments, if the information as the object of transmission or storage is formed with first element arranged in the order that maximizes the search efficiency and the second element arranged in the order that maximizes the encoding efficiency, it follows that the information thus formed realizes both high encoding efficiency and high search efficiency. Besides, encoding efficiency may be maximized when the first and second elements are arranged respectively in different orders, or search efficiency may be maximized when the first and second elements are arranged respectively in different orders.

THIRD EMBODIMENT

Figure 16:
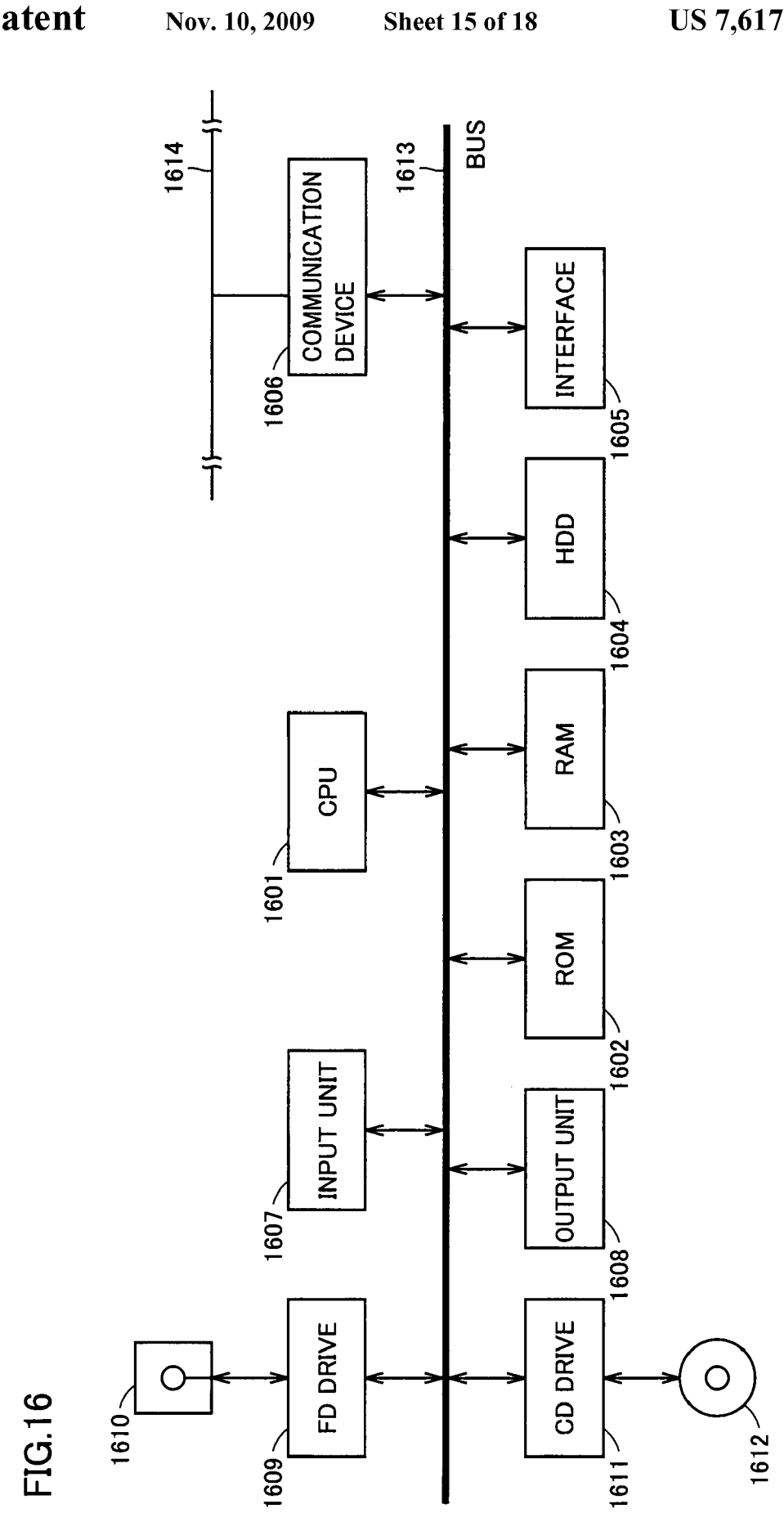
FIG. 16 shows a hardware configuration of the information managing device in accordance with the first and second embodiments.

The procedure of information management in accordance with the first and second embodiments described above is executed based on a program. FIG. 16 is a schematic diagram showing the hardware configuration of the device corresponding to the information managing device in accordance with the first and second embodiments. Specifically, the device of FIG. 16 includes: a CPU (Central Processing Unit) 1601 for centralized control and monitoring of various portions of the device; an ROM (Read Only Memory) 1602 for storing various programs and data; an RAM (Random Access Memory) 1603; an HDD (Hard Disk Drive) 1604; an interface 1605 for connection to an external storage device such as a DVD (Digital Versatile Disk) or a memory card; a communication device 1606 for connection to various communication networks 1614 including the Internet; an input unit 1607 including a keyboard, a mouse and buttons; an output unit 1608 for displaying the video image, outputting voice and displaying characters; an FD drive for accessing to a detachably mounted FD (flexible Disk) 1610; a CD drive 1611 for accessing to a detachably mounted CD (Compact Disk) 1612; and a bus 1613 allowing communication between each of these units.

In the first embodiment, at the time of encoding the information table, a table dividing program corresponding to table dividing unit 101, a position information encoding program corresponding to position information encoding unit 102, an element information rearranging and correspondence information extracting program corresponding to element information rearranging unit 103 and correspondence information extracting unit 104, correspondence information encoding program corresponding to correspondence information encoding unit 105, and a compressed information forming program corresponding to compressed information forming unit 106, stored in advance in ROM 1602, RAM 1603 or HDD 1604 are loaded by CPU 1601 to a prescribed storage area of CPU 1601, not shown. CPU 1601 interprets and executes instructions of respective programs, to realize the following operation. Here, table 60 containing position information 62 and values 61 of element information is generated in advance and stored in RAM 1603 or HDD1604. Table 707 and coding rule data 709 of FIG. 9 are stored in advance as pieces of information that can be referred to by CPU 1601, in ROM 1602.

First, CPU 1601 reads table 60 already stored in RAM 1603 or HDD 1604 in accordance with the loaded table dividing program, extracts position information 62 from the read table 60 and divides (reads) the same from table 60. The divided position information 62 is encoded in accordance with the loaded position information encoding program, and the encoded position information 62 is temporarily stored in RAM 1603 or in HDD 1604. Further, from table 60 already stored in RAM 1603 or HDD 1604, values 61 of element information are extracted and divided (read) from table 60. Then, the divided values 61 of element information are rearranged in accordance with the loaded element information rearranging and correspondence information extracting programs, correspondence information 703 is extracted (generated), and the rearranged values 61 of element information and the extracted correspondence information 703 are temporarily stored in RAM 1603 and HDD 1604. Next, correspondence information 703 is encoded in accordance with the loaded correspondence information encoding program, and the encoded correspondence information 703 is stored temporarily in RAM 1603 or HDD 1604. Finally, compressed information 708 is formed using the encoded position information 62 and correspondence information 703 as well as rearranged values 61 of element information, in accordance with the loaded compressed information forming program, and the formed compressed information 708 is stored in RAM 1603 or HDD 1604.

Compressed information 708 is utilized for efficient storage and transmission of the information of table 60, and provided to other device having an information table decoding function through a recording medium of an external recording device connected by interface 1605, through communication network 1614 connected by a communication device 1606, through an FD 1610 mounted on FD drive 1609, or through a CD 1612 mounted on CD drive 1611.

In the first embodiment described above, when the information table is decoded, a compressed information dividing program corresponding to compressed information dividing unit 201, a position information decoding program corresponding to position information decoding unit 202, a correspondence information decoding program corresponding to correspondence information decoding unit 203, a position information rearranging program corresponding to position information rearranging unit 204, and a table forming program corresponding to table forming unit 205, stored in ROM 1602, RAM 1603 or HDD 1604 in advance, are loaded by CPU 1601 to a prescribed memory area of CPU 1601, and CPU 1601 interprets and executes instructions of respective programs, to realize the following operation. Here, compressed information 708 is obtained through a recording medium from interface 1605, or through communication network 1614 from communication device 1606, and stored in advance in RAM 1603 or HDD 1604.

CPU 1601 divides the values 61 of element information from compressed information 708 stored in RAM 1603 or HDD 1604 in accordance with the loaded compressed information dividing program 201, and temporarily stores the divided values 61 of element information in RAM 1603 or HDD 1604. Further, it divides the encoded position information 62 from compressed information 708 in accordance with the compressed information dividing program 201, decodes the divided position information 62 in accordance with the loaded position information decoding program, and temporarily stores the decoded position information in RAM 1603 or HDD 1604. Similarly, it divides the encoded correspondence information 703 from compressed information 708, decodes the divided correspondence information 703 in accordance with the loaded correspondence information decoding program, and temporarily stores the decoded correspondence information 703 in RAM 1603 or HDD 1604. Next, the decoded position information 62 is rearranged based on the decoded correspondence information 703 in accordance with the loaded position information rearranging program, and the rearranged position information 62 is temporarily stored in RAM 1603 or HDD 1604. Finally, in accordance with the loaded table forming program, using the values 61 of element information and (decoded and rearranged) position information 62, table 601 is formed, and the table 601 thus formed is stored in RAM 1603 or HDD 1604.

Table 601 is utilized as the auxiliary information when a search based on the additional information is executed. Alternatively, it may be provided to other device having a search function through a recording medium of an external recording device connected by interface 1605, through communication network 1614 connected by a communication device 1606, through an FD 1610 mounted on FD drive 1609, or through a CD 1612 mounted on CD drive 1611.

Further, in the second embodiment described above, when the information table is encoded, a table dividing program corresponding to table dividing unit 901, a position information rearranging and correspondence information extracting program corresponding to position information rearranging unit 903 and correspondence information extracting unit 904, a correspondence information encoding program corresponding to correspondence information encoding unit 905, a position information encoding program corresponding to position information encoding unit 902, and a compressed information forming program corresponding to compressed information forming unit 906, stored in ROM 1602, RAM 1603 or HDD 1604, are loaded by CPU 1601, to a prescribed memory area of CPU 1601. CPU 1601 interprets and executes instructions of respective programs, to realize the following operation. Here, table 60 (or 601) containing position information 62 and values 61 of element information is generated in advance and stored in RAM 1603 or HDD 1604. Coding rule data 709 are stored in advance as pieces of information that can be referred to by CPU 1601, in ROM 1602.

CPU 1601 extracts (reads) position information 62 from table 60 (or 601) already stored in RAM 1603 or HDD 1604, in accordance with the loaded table dividing program. Next, the divided position information 62 is rearranged and correspondence information 703 is extracted (generated) in accordance with the loaded position information rearranging and correspondence information extracting programs, and the rearranged position information 62 and extracted correspondence information 703 are temporarily stored in RAM 1603 or HDD 1604. Further, values 61 of element information are divided (read) from table 60 (or 601) already stored in RAM 1603 or HDD 1604 in accordance with the loaded table dividing program, and the divided values 61 of element information are temporarily stored in RAM 1603 or HDD 1604. The rearranged position information 62 is encoded in accordance with the loaded position information encoding program and the encoded position information 62 is temporarily stored in RAM 1603 or HDD 1604. Similarly, correspondence information 703 is encoded in accordance with the loaded correspondence information encoding program, and the encoded correspondence information 703 is temporarily stored in RAM 1603 or HDD 1604. Finally, compressed information 708 is formed using the encoded position information 62 and correspondence information 703 as well as the values 61 of element information, in accordance with the loaded compressed information forming program, and the compressed information 708 thus formed is stored in RAM 1603 or HDD 1604.

Compressed information 708 is utilized for efficient storage and transmission of the information in the form of a table, and provided to other device having an information table decoding function through a recording medium of an external recording device connected by interface 1605, through communication network 1614 connected by a communication device 1606, through an FD 1610 mounted on FD drive 1609, or through a CD 1612 mounted on CD drive 1611.

The operation of CPU 1601 when the information table is decoded in accordance with the second embodiment above is the same as the operation when the information table is decoded in accordance with the first embodiment described above. Therefore, description thereof will not be repeated.

Basically, the information table encoding process described above is automatically executed without any input of specific instruction or information from the user, after the table 60 to be encoded is determined, or in the case of decoding, after the decoding device receives the compressed information 708. It is not limiting, however, and in the device of FIG. 16, for example, an instruction of encoding/decoding may be arbitrarily given by the user through input unit 1607, and CPU 1601 may present the state of operation during the encoding/decoding process to the user through output unit 1608.

In the third embodiment, it is assumed that various programs for executing information management are stored in ROM 1602, RAM 1603 or HDD 1604 in the device of FIG. 16. It is not limiting, and the programs may be recorded on an external computer readable recording medium and when a program is executed, it may be loaded to a memory through interface 1605. The external recording medium may include a magnetic tape, CD-ROM/R/RW, DVD-ROM/RAM/R/RW, MO (magneto-optic), SD (Secure Digital) memory card, FD (Flexible Disk) and the like, not shown. Further, these programs may be transmitted through communication network 1614, received by communication device 1606 and stored in ROM 1602, RAM 1603 or HDD 1604.

In the first to third embodiments, when table 60 (or 601) as the auxiliary information for searching is compressed and encoded, pieces of element information 61 (text information) are held rearranged in the lexicographic order, while position information 62 of each corresponding leaf L is differentially coded based on the order of appearance (in the order of magnitude of numerical values) in the tree-structure, and correspondence information 703 representing correspondence between the position information and the rearranged pieces of element information (or element information and rearranged position information) is encoded and added. Consequently, as the differential coding is used, the position information contained in table 60 can be encoded efficiently, and as the pieces of element information 61 are arranged in lexicographic order, high search efficiency can be attained.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. An encoding device for encoding information formed in a tree-structure in which a defined order relation holds among a plurality of leaves having element information added, comprising:
means for receiving an information group having a plurality of sets, arranged in said defined order, containing element information of a prescribed type and position information representing a position of a leaf having the element information of the prescribed type added, in accordance with said defined order in said tree-structure;
rearranging means for dividing a plurality of pieces of said element information from said plurality of sets of said information group received by said receiving means, and for rearranging said divided plurality of pieces of element information to a prescribed order suitable for searching of said element information of said prescribed type;
correspondence information generating means for generating correspondence information representing correspondence between each of said plurality of pieces of element information after rearrangement and said position information of the same set as the element information in said information group received by said receiving means, based on a change in order of said plurality of pieces of element information caused by the rearrangement from said defined order to said prescribed order by said rearranging means;
position information encoding means for dividing a plurality of pieces of said position information from said plurality of sets in said information group received by said receiving means, and for encoding the divided plurality of pieces of position information; and
compressed information forming means for forming compressed information corresponding to said information group by arranging said plurality of pieces of position information encoded by said position information encoding means, said correspondence information generated by said correspondence information generating means, and said plurality of pieces of element information after rearrangement by said rearranging means in a prescribed form.

2. The encoding device according to claim 1, wherein said position information encoding means encodes each of said plurality of pieces of position information based on difference between a piece of the position information of interest and a piece of the position information representing a position immediately preceding the position represented by the position information of interest in accordance with said defined order.

3. The encoding device according to claim 1, wherein said correspondence information generating means includes
correspondence information encoding means for generating said correspondence information by encoding information representing said correspondence.

4. The encoding device according to claim 1, wherein said element information is encoded prior to formation of said compressed information by said compressed information forming means.

5. The encoding device according to claim 1, wherein said information formed in a tree-structure is information for searching for video data.

6. An encoding device for encoding information formed in a tree-structure in which a defined order relation holds among a plurality of leaves having element information added, comprising:
means for receiving an information group having a plurality of sets, arranged in a prescribed order suitable for searching for said element information of a prescribed type, containing element information of said prescribed type and position information representing a position of a leaf having the element information of the prescribed type added, in accordance with said defined order in said tree-structure;
element information dividing means for dividing and outputting a plurality of pieces of said element information from said plurality of sets in said information group received by said receiving means;
position information rearranging means for dividing a plurality of pieces of said position information from said plurality of sets in said information group received by said receiving means, and for rearranging said divided plurality of pieces of position information in accordance with said defined order;
correspondence information generating means for generating correspondence information representing correspondence between each of said plurality of pieces of position information after rearrangement and said element information of the same set as the position information in said information group received by said receiving means, based on a change in order of said plurality of pieces of position information caused by rearrangement by said position information rearranging means;

position information encoding means for encoding said plurality of pieces of position information rearranged by said position information rearranging means; and compressed information forming means for forming compressed information corresponding to said information group, by arranging said plurality of pieces of position information encoded by said position information encoding means, said correspondence information generated by said correspondence information generating means, and said plurality of pieces of element information output from said element information dividing means in a prescribed form.

7. The encoding device according to claim 6, wherein said position information encoding means encodes each of said plurality of pieces of position information based on difference between a piece of the position information of interest and a piece of the position information representing a position immediately preceding the position represented by the position information of interest in accordance with said defined order.

8. The encoding device according to claim 6, wherein said correspondence information generating means includes correspondence information encoding means for generating said correspondence information by encoding information representing said correspondence.

9. The encoding device according to claim 6, wherein said element information is encoded prior to formation of said compressed information by said compressed information forming means.

10. The encoding device according to claim 6, wherein said information formed in a tree-structure is information for searching for video data.

11. A decoding device for decoding compressed information provided by encoding an information group in information formed in a tree-structure in which a defined order relation holds among a plurality of leaves having element information added, wherein:

said information group has a plurality of sets including element information of a prescribed type in the information formed in said tree-structure, and position information representing the position of a leaf having the element information of the prescribed type added, in said tree-structure, said device comprising:

compressed information receiving means for receiving compressed information formed to include a plurality of pieces of element information of a prescribed type arranged in a prescribed order suitable for searching said element information of said prescribed type, a plurality of encoded pieces of position information representing positions of the plurality of leaves having the plurality of pieces of element information added in accordance with said defined order in said tree-structure, and correspondence information representing correspondence between each of said plurality of pieces of element information arranged in said prescribed order and said plurality of encoded pieces of position information representing positions of the plurality of leaves having the plurality of pieces of element information added in accordance with said defined order;

dividing means for dividing and outputting said plurality of pieces of element information, encoded said plurality of pieces of position information and said correspondence information, from said compressed information received by said compressed information receiving means;

position information decoding means receiving as inputs encoded said plurality of pieces of position information output from said dividing means, for decoding said input plurality of pieces of position information;

rearranging means receiving as an input said correspondence information output from said dividing means, for rearranging decoded said plurality of pieces of position information decoded by said position information decoding means, based on said input correspondence information; and means for generating and outputting said information group having each of said plurality of pieces of position information rearranged by said rearranging means and each of said plurality of pieces of element information arranged in said prescribed order input from said dividing means, related in correspondence with each other.

12. The decoding device according to claim 11, wherein said information formed in a tree-structure is information for searching for video data.

13. A method operable on a computer of encoding information formed in a tree-structure in which a defined order relation holds among a plurality of leaves having element information added, comprising:

receiving step of receiving an information group having a plurality of sets, arranged in said defined order, containing element information of a prescribed type and position information representing a position of a leaf having the element information of the prescribed type added, in accordance with said defined order in said tree-structure;

rearranging step of dividing a plurality of pieces of said element information from said plurality of sets of said information group received in said receiving step, and rearranging said divided plurality of pieces of element information to a prescribed order suitable for searching of said element information of said prescribed type;

correspondence information generating step of generating correspondence information representing correspondence between each of said plurality of pieces of element information after rearrangement and said position information of the same set as the element information in said information group received in said receiving step, based on a change in order of said plurality of pieces of element information caused by the rearrangement from said defined order to said prescribed order by said rearranging step;

position information encoding step of dividing a plurality of pieces of said position information from said plurality of sets in said information group received in said receiving step, and encoding the divided plurality of pieces of position information; and compressed information forming step of forming compressed information corresponding to said information group, by arranging said plurality of pieces of position information encoded by said position information encoding step, said correspondence information generated by said correspondence information generating step, and said plurality of pieces of element information after rearrangement by said rearranging step in a prescribed form.

14. A method operable on a computer of encoding information formed in a tree-structure in which a defined order relation holds among a plurality of leaves having element information added, comprising:

receiving step of receiving an information group having a plurality of sets, arranged in a prescribed order suitable for searching for said element information of a prescribed type, containing element information of said prescribed type and position information representing a position of a leaf having the element information of the prescribed type added, in accordance with said defined order in said tree-structure;

element information dividing step of dividing and outputting a plurality of pieces of said element information from said plurality of sets in said information group received in said receiving step;

position information rearranging step of dividing a plurality of pieces of said position information from said plurality of sets in said information group received in said receiving step, and rearranging said divided plurality of pieces of position information in accordance with said defined order;

correspondence information generating step of generating correspondence information representing correspondence between each of said plurality of pieces of position information after rearrangement and said element information of the same set as the position information in said information group received in said receiving step, based on a change in order of said plurality of pieces of position information caused by rearrangement by said position information rearranging step;

position information encoding step of encoding said plurality of pieces of position information rearranged by said position information rearranging step; and compressed information forming step of forming compressed information corresponding to said information group, by arranging said plurality of pieces of position information encoded by said position information encoding step, said correspondence information generated by said correspondence information generating step, and said plurality of pieces of element information output from said element information dividing step in a prescribed form.

15. A method operable on a computer of decoding compressed information provided by encoding an information group in information formed in a tree-structure in which a defined order relation holds among a plurality of leaves having element information added, wherein:

said information group has a plurality of sets including element information of a prescribed type in the information formed in said tree-structure, and position information representing the position of a leaf having the element information of the prescribed type added, in said tree-structure;

said decoding method comprising:

compressed information receiving step of receiving compressed information formed to include a plurality of pieces of element information of a prescribed type arranged in a prescribed order suitable for searching said element information of said prescribed type, a plurality of encoded pieces of position information representing positions of the plurality of leaves having the plurality of pieces of element information added in accordance with said defined order in said tree-structure, and correspondence information representing correspondence between each of said plurality of pieces of element information arranged in said prescribed order and said plurality of encoded pieces of position information representing positions of the plurality of leaves having the plurality of pieces of element information added in accordance with said defined order;

dividing step of dividing and outputting said plurality of pieces of element information, encoded said plurality of pieces of position information and said correspondence information, from said compressed information received in said compressed information receiving step;

position information decoding step of receiving as inputs encoded said plurality of pieces of position information output from said dividing step, and decoding said input plurality of pieces of position information;

rearranging step of receiving as an input said correspondence information output from said dividing step, and rearranging decoded said plurality of pieces of position information decoded by said position information decoding step, based on said input correspondence information; and the step of generating and outputting said information group having each of said plurality of pieces of position information rearranged by said rearranging step and each of said plurality of pieces of element information arranged in said prescribed order input from said dividing step, related in correspondence with each other.

16. A machine-readable recording medium recording a program causing a computer to execute the method of claim 13.

17. A machine-readable recording medium recording a program causing a computer to execute the method of claim 14.

18. A machine-readable recording medium recording a program causing a computer to execute the method of claim 15.

* * * * *